(12) United States Patent
Shiraishi et al.

(10) Patent No.: US 10,309,763 B2
(45) Date of Patent: Jun. 4, 2019

(54) RAIL POSITION MEASUREMENT DEVICE

(71) Applicant: Mitsubishi Electric Corporation, Chiyoda-ku, Tokyo (JP)

(72) Inventors: Hiroyuki Shiraishi, Tokyo (JP); Katsuyuki Kamei, Tokyo (JP); Kenichi Sugo, Tokyo (JP); Mitsunobu Yoshida, Tokyo (JP); Masashi Watanabe, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 142 days.

(21) Appl. No.: 15/500,636

(22) PCT Filed: Mar. 11, 2015

(86) PCT No.: PCT/JP2015/057136
§ 371 (c)(1),
(2) Date: Jan. 31, 2017

(87) PCT Pub. No.: WO2016/021224
PCT Pub. Date: Feb. 11, 2016

(65) Prior Publication Data
US 2017/0219335 A1 Aug. 3, 2017

(30) Foreign Application Priority Data
Aug. 7, 2014 (JP) .................... 2014-161563

(51) Int. Cl.
*B61L 15/00* (2006.01)
*B61L 23/04* (2006.01)
(Continued)

(52) U.S. Cl.
CPC .......... *G01B 11/002* (2013.01); *B61L 15/0072* (2013.01); *B61L 23/045* (2013.01);
(Continued)

(58) Field of Classification Search
CPC .......... E01B 35/00; E01B 35/06; E01B 35/08; E01B 35/12; B61L 23/04; B61L 23/041;
(Continued)

(56) References Cited

U.S. PATENT DOCUMENTS 9,205,850 B2   12/2015   Shimada et al.
9,707,983 B2    7/2017   Soda et al.
(Continued)

FOREIGN PATENT DOCUMENTS

DE   102007015257 A1 * 10/2007
EP     2 165 915 A2    3/2010
(Continued)

OTHER PUBLICATIONS

International Search Report (PCT/ISA/210) dated Jun. 9, 2015, by the Japanese Patent Office as the International Searching Authority for International Application No. PCT/JP2015/057136.
(Continued)

*Primary Examiner* — Gordon J Stock, Jr.
(74) *Attorney, Agent, or Firm* — Buchanan Ingersoll & Rooney PC

(57) ABSTRACT

A rail position measurement device that measures a three-dimensional position of a rail using a measurement vehicle includes: a position posture measurement device to measure a position and a posture of the measurement vehicle; and a laser scanner that is a sensor installed on the measurement vehicle so as to be capable of irradiating at least a web and a bottom of a side surface of the rail with laser light and used for measuring the three-dimensional position of the rail.

20 Claims, 20 Drawing Sheets

(51) Int. Cl.
  *B61L 25/02* (2006.01)
  *B61L 27/00* (2006.01)
  *E01B 35/00* (2006.01)
  *G01B 11/00* (2006.01)
  *G01B 11/24* (2006.01)
  *G01B 11/25* (2006.01)
  *G01C 15/00* (2006.01)

(52) U.S. Cl.
  CPC .......... *B61L 23/047* (2013.01); *B61L 23/048* (2013.01); *B61L 25/025* (2013.01); *E01B 35/00* (2013.01); *G01B 11/24* (2013.01); *G01B 11/2518* (2013.01); *G01C 15/00* (2013.01); *B61L 23/041* (2013.01); *B61L 25/021* (2013.01); *B61L 25/026* (2013.01); *B61L 27/0088* (2013.01); *B61L 2205/04* (2013.01)

(58) Field of Classification Search
  CPC .... B61L 23/042; B61L 23/044; B61L 23/045; B61L 23/047; B61L 23/048; B61L 15/0072; B61L 15/0081; B61L 27/0083; B61L 27/0088; B61L 2205/04; G01B 11/002; G01B 11/005; G01B 11/03; G01B 11/24; G01B 11/25; G01B 11/2518; G01B 11/30; G01B 11/303; G01B 11/306; G01C 7/00; G01C 15/00; G01C 5/00; G01C 3/00; G01C 3/06; G01C 3/08; G01C 3/10; G01C 3/20; G01C 3/22; G01C 3/24; G01C 3/26; G01C 3/28
  See application file for complete search history.

(56) References Cited

U.S. PATENT DOCUMENTS 10,040,463 B2 * 8/2018 Singh .................... B61L 23/044

| | | | |
|---|---|---|---|
| 2009/0073428 A1 | 3/2009 | Magnus et al. | |
| 2014/0341435 A1 | 11/2014 | Shimada et al. | |
| 2016/0114817 A1 * | 4/2016 | Soda | ...................... G01B 21/20 73/146 |

FOREIGN PATENT DOCUMENTS

| | | |
|---|---|---|
| JP | 2000-171220 A | 6/2000 |
| JP | 2003-207319 A | 7/2003 |
| JP | 2005-69700 A | 3/2005 |
| JP | 2010-202017 A | 9/2010 |
| JP | 2011-69699 A | 4/2011 |
| JP | 2013-136352 A | 7/2013 |
| JP | 2013-246042 A | 12/2013 |
| WO | 2005/108676 A1 | 11/2005 |
| WO | 2013/099612 A1 | 7/2013 |
| WO | 2013/175930 A1 | 11/2013 |
| WO | WO 2015/198423 A1 | 12/2015 |
| WO | WO 20150197206 A1 * | 12/2015 |

OTHER PUBLICATIONS

Written Opinion (PCT/ISA/237) dated Jun. 9, 2015, by the Japanese Patent Office as the International Searching Authority for International Application No. PCT/JP2015/057136.

English Translation of Office Action dated Oct. 2, 2015, Notification of Reason for Refusal for Japanese Application No. 2015-542083.

Second Chinese Office Action dated Nov. 7, 2018 issued by The State Intellectual Property Office of People's Republic of China in corresponding Chinese Application No. 201580039589.9 with English Translation (12 pages).

Third Office Action dated Feb. 3, 2019 issued by The State Intellectual Property Office of People's Republic of China in corresponding Chinese Application 201580039589.9 with English Translation (11 pages total).

* cited by examiner

TRAVELLING DIRECTION

<EXEMPLARY VALUES OF VARIABLES FOR MAJOR RAILS>

| VARIABLE | 60 kg RAIL (BULLET TRAIN) | 50 kgN RAIL (CONVENTIONAL LINE) |
|---|---|---|
| a | 40.875 mm | 37.2 mm |
| c | 143.9 mm | 123 mm |
| d | 24.25 mm | 25 mm |

<EXEMPLARY VALUES OF VARIABLES FOR DERAILMENT PREVENTION GUARD>

| VARIABLE | VALUE |
|---|---|
| b | 20 mm |
| e | 85 mm |

SLOPE OF L3
60 kg RAIL→1:4
50 kgN RAIL→1:1.275

<VALUES OF VARIABLE f ASSOCIATED WITH VALUES OF VARIABLES IN FIGS. 18 AND 19>

| VARIABLE | 60 kg RAIL (BULLET TRAIN) | 50 kgN RAIL (CONVENTIONAL LINE) |
|---|---|---|
| f | 185.5 mm | 172.0 mm |

<ha AND hb FOR 60 kg RAIL WITH STANDARD GAUGE>

<ha AND hb FOR 50 kgN RAIL WITH STANDARD GAUGE>

<ha AND hb FOR 50 kgN RAIL WITH NARROW GAUGE>

<APPROPRIATE LASER IRRADIATION POSITIONS(Hv)>

| GAUGE(G) | STANDARD GAUGE(1435 mm) | | NARROW GAUGE (1067 mm) |
|---|---|---|---|
| RAIL | 60 kg RAIL | 50 kgN RAIL | |
| (1) Hv | 1728 mm | 1362 mm | 985 mm |
| (2) Hv | 1773 mm | 1670 mm | 1222 mm |

FIG.32

<APPROPRIATE LASER IRRADIATION POSITIONS(Hv)>

| GAUGE(G) | STANDARD GAUGE(1435 mm) | | NARROW GAUGE (1067 mm) |
|---|---|---|---|
| RAIL | 60 kg RAIL | 50 kgN RAIL | |
| (3) $\phi 1 = \phi 2$ | 1321 mm | 1119 mm | 807 mm |
| (4) $\phi 1 + \phi 2$ | 1302 mm | 1258 mm | 911 mm |

FIG.33

<LASER IRRADIATION POSITIONS FOR ENABLING MEASUREMENT OF TWO OR MORE POINTS ON EACH OF RAIL WEB AND RAIL BOTTOM(Hv)>

| GAUGE(G) | STANDARD GAUGE(1435 mm) | | NARROW GAUGE (1067 mm) |
|---|---|---|---|
| RAIL | 60 kg RAIL | 50 kgN RAIL | |
| MINIMUM VALUE | 1006 mm | 873 mm | 619 mm |
| MAXIMUM VALUE | 2339 mm | 1955 mm | 1509 mm |

RAIL POSITION MEASUREMENT DEVICE

FIELD

The present invention relates to a rail position measurement device that measures the three-dimensional position of a rail using a running vehicle.

BACKGROUND

Conventionally, a technique for acquiring three-dimensional data on a railroad area using a measurement vehicle equipped with a laser scanner to perform construction limit measurement or the like is provided.

For example, the following Patent Literature 1 discloses a three-dimensional data acquisition device including a first laser scanner and a second laser scanner. Specifically, the first laser scanner is a device configured to emit laser light to an object while rotating the laser light and to receive the reflected light in order to measure the distance to the object to be measured. The first laser scanner is installed on an upper part of a railroad vehicle such that a measurement cross section forming a rotation cross section of the laser light in an emission direction forms a vertical plane with respect to the travelling direction of the railroad vehicle. The second laser scanner is a device configured to emit laser light to the object while rotating the laser light and to receive the reflected light in order to measure the distance to the object. The second laser scanner is installed on the upper part of the railroad vehicle such that a measurement cross section forming a rotation cross section of the laser light in the emission direction forms a plane inclined at a predetermined angle in a substantially travelling direction with respect to the measurement cross section of the first laser scanner.

CITATION LIST

Patent Literature

Patent Literature 1: Japanese Patent Application Laid-Open No. 2005-69700

SUMMARY

Technical Problem

One of the types of railroad area measurement is the measurement of a rail itself. For example, measurements using a clearance car are generally performed using the position of the rail as a reference. Therefore, performing the measurement of the position of the rail with a high degree of accuracy is fundamental to railroad area measurement.

In the above-mentioned conventional technique, however, because the laser scanner serving as a sensor is provided on the upper part of the railroad vehicle, there is a problem in that the laser light does not reach the rail web that is shielded from the laser light, and the position of the rail web cannot be accurately obtained.

It is possible to specify the three-dimensional position of the rail from measurement data of a rail head. However, because the rail head is burnished due to contact with the wheels, there is a problem in that laser measurement light undergoes specular reflection, and thus sufficient reflected light does not return to the laser scanner and the measurement cannot be performed with a high degree of accuracy.

Even if the laser scanner is fixed to the vehicle, the position of the rail varies with respect to the vehicle or the laser scanner due to the curves of the rail and left and right movement of the running train. Therefore, the position of the rail still has to be measured with a high degree of accuracy.

The present invention has been made in view of the above, and an object thereof is to provide a rail position measurement device capable of measuring the three-dimensional position of a rail with a high degree of accuracy.

Solution to Problem

In order to solve the above problems and achieve the object, an aspect of the present invention is a rail position measurement device that measures a three-dimensional position of a rail using a measurement vehicle. The rail position measurement device includes: a position posture measurement device installed on the measurement vehicle to measure a position and a posture of the measurement vehicle; and a laser scanner that is a sensor installed on the measurement vehicle so as to be capable of irradiating at least a web and a bottom of a side surface of the rail with laser light and used for measuring the three-dimensional position of the rail.

Advantageous Effects of Invention

The present invention achieves such an effect that the three-dimensional position of a rail can be measured with a high degree of accuracy.

BRIEF DESCRIPTION OF DRAWINGS

FIG. 32 is a diagram illustrating values of Hv that satisfy $\varphi 1=\varphi 2$ and values of Hv that maximize $\varphi 1+\varphi 2$.

FIG. 33 is a diagram illustrating a computation result for the laser irradiation positions for enabling the measurement of two or more points on each of the rail web and the rail bottom.

DESCRIPTION OF EMBODIMENTS

A rail position measurement device according to embodiments of the present invention will be described below with reference to the accompanying drawings. The present invention is not limited to the following embodiments.

First Embodiment

Figure 1:
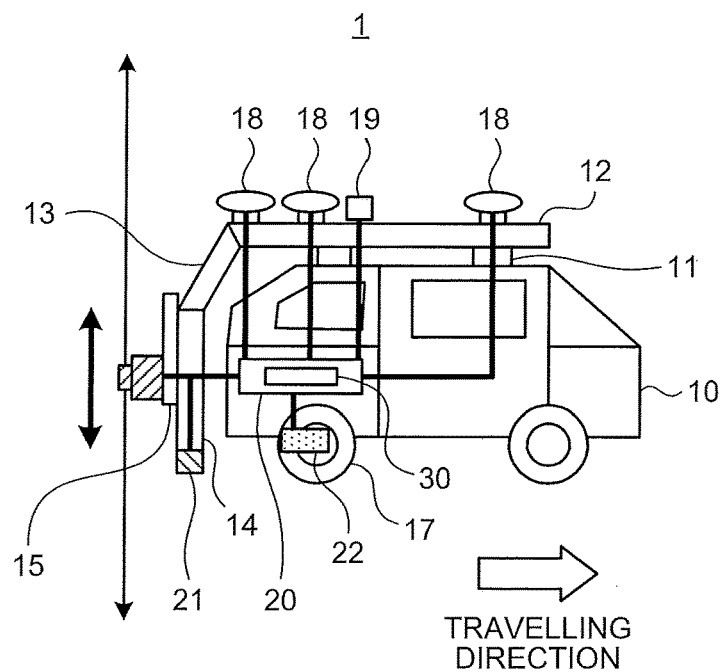
FIG. 1 is a side view illustrating an exemplary configuration of a measurement vehicle equipped with a rail position measurement device according to a first embodiment.

FIG. 1 is a diagram illustrating an exemplary configuration of a measurement vehicle 1 equipped with a rail position measurement device according to a first embodiment, and the diagram of the measurement vehicle 1 viewed from a side. As illustrated in FIG. 1, the measurement vehicle 1 according to the first embodiment is configured such that a top plate 12 held via a support unit 11 is provided above a vehicle 10, and three GPS receivers 18 and an inertial sensor 19 are installed on the upper part of the top plate 12. The top plate 12 constitutes a stand unit (hereinafter referred to as a "base unit" as necessary) serving as a reference for the installation positions of the GPS receivers 18 and the inertial sensor 19 and the position of a laser scanner 16, which will be described later.

A side plate 14 for installing the laser scanner 16 is provided on the rear side of the vehicle 10. The side plate 14 is coupled to the top plate 12 via an extension top plate 13 and fixed. The side plate 14 constitutes the base unit of the measurement vehicle 1 together with the top plate 12.

A slide unit 15 configured to be movable in a direction represented by the thick bidirectional arrow in the drawing, i.e., an up-down direction, is provided on the side plate 14. The laser scanner 16 is installed on the slide unit 15. Specifically, a movable mechanism that can change the installation position of the laser scanner 16 is provided on the slide unit 15, and the laser scanner 16 is configured such that the installation position can be changed in the up-down direction by the slide unit 15. The movable mechanism provided on the slide unit 15 may be constructed using any realization means or realization method regardless of variations in the means and the method.

In addition to the above-mentioned configuration, the vehicle 10 is equipped with a data processing unit 20 including a data storage unit 30 and an odometer 22.

Next, a function of each component of the rail position measurement device will be described. As used herein, a rail position means a position on a three-dimensional coordinate system by which a position of a rail in a three-dimensional space can be obtained. However, information for obtaining the position of the rail on the three-dimensional coordinate system also includes position information on a two-dimensional coordinate system for obtaining a cross-sectional shape of the rail.

The GPS receiver 18, the inertial sensor 19, the odometer 22, and a velocity detection device 21 are examples of positioning sensors.

The GPS receiver 18 receives a positioning signal from a GPS satellite that is a positioning satellite. The GPS receiver 18 stores, in the data storage unit 30 of the data processing unit 20, a navigation message set in the positioning signal and information on the carrier wave phase of the positioning signal as GPS data every receipt time or measurement time. The GPS data is an example of positioning information. The three GPS receivers 18 are installed on the top plate 12 so as to be triangularly arranged, and they calculate the three-dimensional position and posture (direction and slope) of the top plate 12. The GPS receiver 18 may be a receiver that receives a positioning signal from another satellite in different global navigation satellite systems (GNSS).

The inertial sensor 19 measures a minute change in the angular velocity of the three-dimensional posture angle of the measurement vehicle 1 while the measurement vehicle 1 is stationary or is running. The inertial sensor 19 then stores the measurement data in the data storage unit 30 every measurement time.

The odometer 22 counts the number of rotations of a wheel 17 to measure a minute change amount of running velocity of the measurement vehicle 1. The odometer 22 then stores the measurement data in the data storage unit 30 every measurement time.

The velocity detection device 21 is a device that detects the running velocity of the measurement vehicle 1. In a case where the measurement vehicle 1 is placed on a truck to perform the measurement, as in an embodiment which will be described later, the running velocity cannot be measured by the odometer 22. Therefore, in a case where the odometer 22 cannot be used, the velocity detection device 21 is used to detect the running velocity of the measurement vehicle 1, and it stores the detected data in the data storage unit 30 every detection time.

The laser scanner 16 is a sensor for measuring the three-dimensional position of a measurement object, i.e., a rail. As represented by the thin arrow in the drawing, the laser scanner 16 can scan a plane orthogonal to the travelling direction. Alternatively, an irradiation direction can be set such that the laser scanner 16 scans a plane inclined at an arbitrary angle within a preset angle range in the travelling direction from the plane orthogonal to the travelling direction. While the measurement vehicle 1 is running, the laser scanner 16 radiates laser light and receives the laser light reflected from the measurement object, i.e., the rail. The laser scanner 16 then measures, as a distance orientation point, the distance and orientation from the laser scanner 16 to each irradiation point irradiated with the laser light on the basis of a period of time from the irradiation to the reception of the laser light and on the basis of the irradiation direction of the laser light. In other words, the distance orientation point represents the distance and orientation from the measurement vehicle 1 to the measurement object. The laser scanner 16 stores a group of distance orientation points including a plurality of measured distance orientation points in the data storage unit 30 every measurement time or acquisition time.

Figure 2:
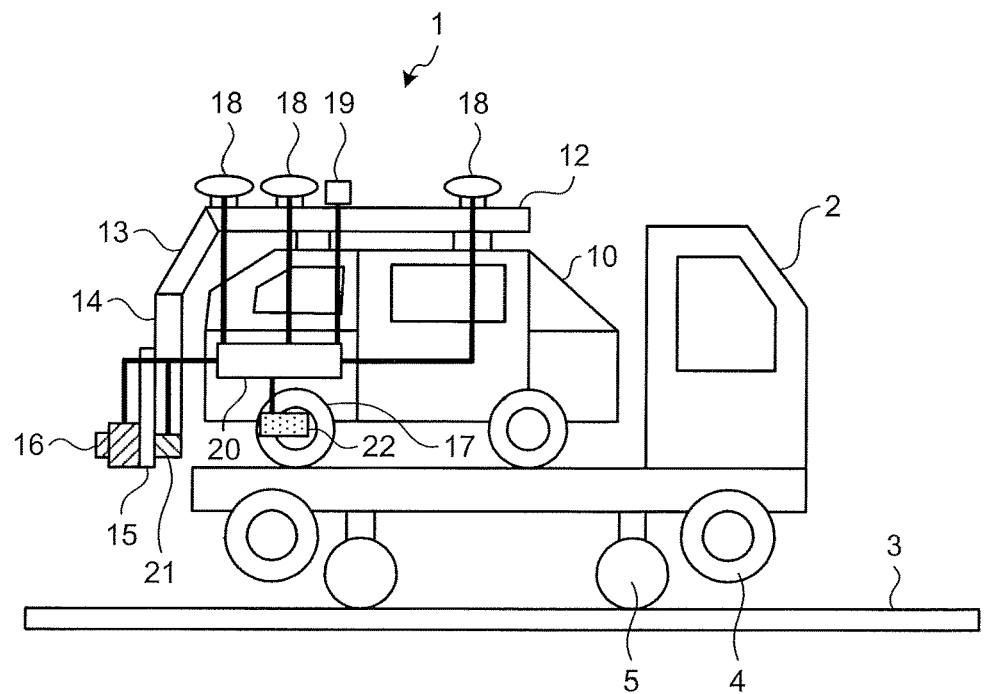
FIG. 2 is a diagram illustrating an exemplary case where measurement of a rail on which a railroad vehicle is running is performed using the measurement vehicle according to the first embodiment illustrated in FIG. 1.

FIG. 2 is a diagram illustrating an exemplary case where measurement of a rail on which a railroad vehicle is running is performed using the measurement vehicle 1 according to the first embodiment illustrated in FIG. 1. In a case where the shape of a rail 3 is measured using the measurement vehicle 1 according to the first embodiment, the measurement vehicle 1 is installed on a road-rail truck 2 as illustrated in FIG. 2, whereby the measurement can be performed. The road-rail truck 2 includes wheels 4 so as to be able to run on a road. In a case where the road-rail truck 2 runs on the rails 3, the ground contact area of iron wheels 5 is set lower than the ground contact area of the wheels 4, whereby the road-rail truck 2 can run on the rails 3. In a case where the measurement vehicle 1 is installed on the road-rail truck 2, the installation position of the laser scanner 16 is elevated. However, because the measurement vehicle 1 of the first embodiment includes the slide unit 15, the installation position of the laser scanner 16 with reference to a rail plane can be changed by the slide unit 15.

Figure 3:
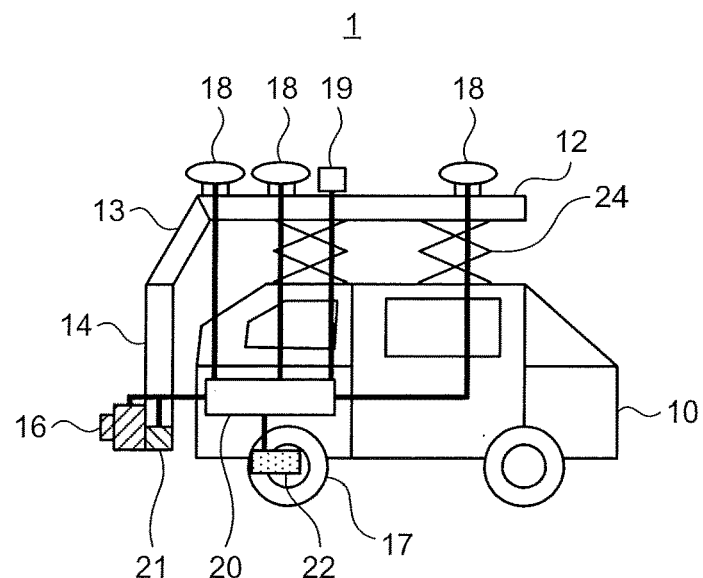
FIG. 3 is a diagram illustrating another exemplary configuration of the measurement vehicle according to the first embodiment illustrated in FIG. 1.

FIG. 3 is a diagram illustrating another exemplary configuration of the measurement vehicle 1 according to the first embodiment illustrated in FIG. 1. In the example illustrated in FIG. 1, the slide unit 15 has the function of changing the installation position of the laser scanner 16 in the up-down direction. In the example illustrated in FIG. 3, however, a base position adjustment device 24 provided between the vehicle 10 and the top plate 12 has this function. The base position adjustment device 24 expands and contracts in the up-down direction, whereby the top plate 12 can be moved in the up-down direction. Therefore, the side plate 14 coupled to the top plate 12 via the extension top plate 13 can be moved in the up-down direction, and the installation position of the laser scanner 16 can be changed.

The configuration in FIG. 3 achieves such an effect that the support unit 11 and the slide unit 15 can be omitted. Owing to the presence of the base position adjustment device 24, a relative positional relation between the installation position of the laser scanner 16 and the positioning sensors for measuring the position and the posture of the measurement vehicle 1, i.e., the GPS receiver 18 and the inertial sensor 19, does not change even when the installation position of the laser scanner 16 is changed. Therefore, the base position adjustment device 24 achieves such an effect that any effect of the change of the installation position of the laser scanner 16 on measurement accuracy can be reduced.

Figure 4:
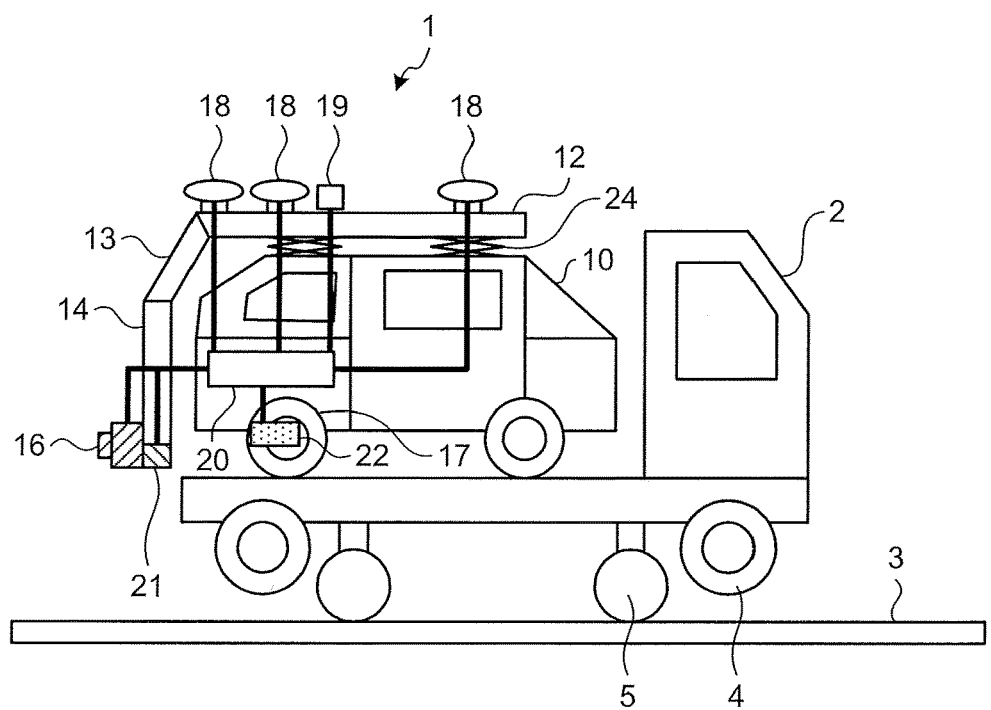
FIG. 4 is a diagram illustrating an exemplary configuration in which the measurement vehicle illustrated in FIG. 3 is installed on a road-rail truck.

FIG. 4 is a diagram illustrating an exemplary configuration in which the measurement vehicle 1 illustrated in FIG. 3 is installed on the road-rail truck 2. The configuration illustrated in FIG. 4 enables the measurement of the shape of the rail 3.

Figure 5:
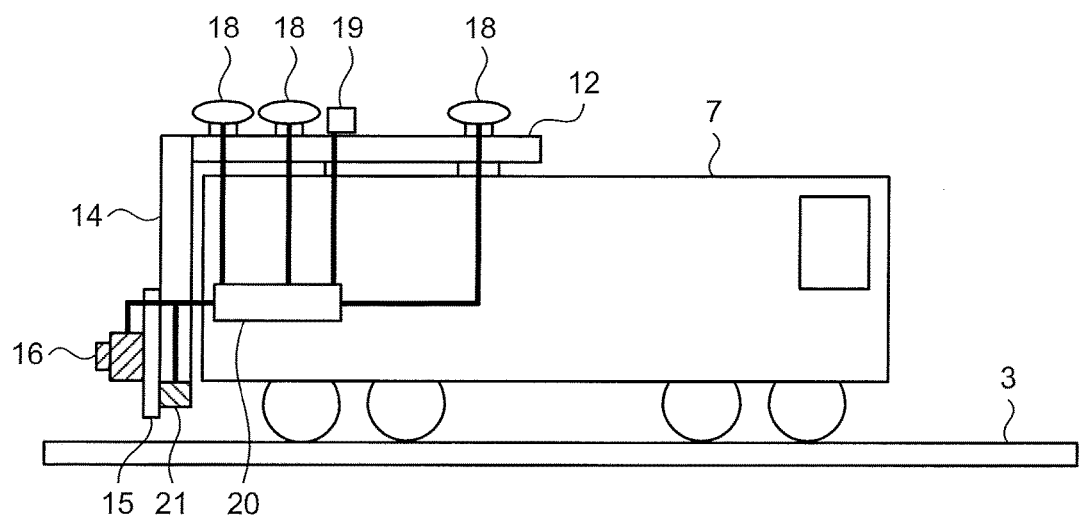
FIG. 5 is a diagram illustrating an exemplary configuration in which the rail position measurement device according to the first embodiment is installed on a railroad vehicle.

FIG. 5 is a diagram illustrating an exemplary configuration in which the rail position measurement device according to the first embodiment is installed on a railroad vehicle 7. According to the configuration in FIG. 5, the installation position changing function for the laser scanner 16 can be realized by the slide unit 15 in the same way as with the measurement vehicle 1 illustrated in FIG. 1.

Figure 6:
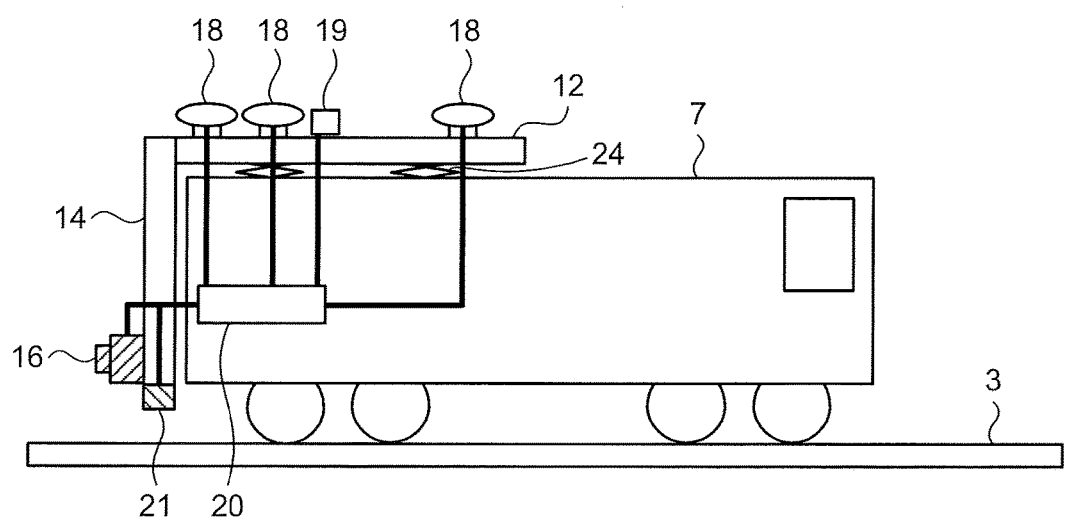
FIG. 6 is a diagram illustrating another exemplary configuration in which the rail position measurement device according to the first embodiment is installed on the railroad vehicle.

FIG. 6 is a diagram illustrating another exemplary configuration in which the rail position measurement device according to the first embodiment is installed on the railroad vehicle 7. According to the configuration in FIG. 6, the installation position changing function for the laser scanner 16 can be realized by the base position adjustment device 24 in the same way as with the measurement vehicle 1 illustrated in FIG. 3.

Figure 7:
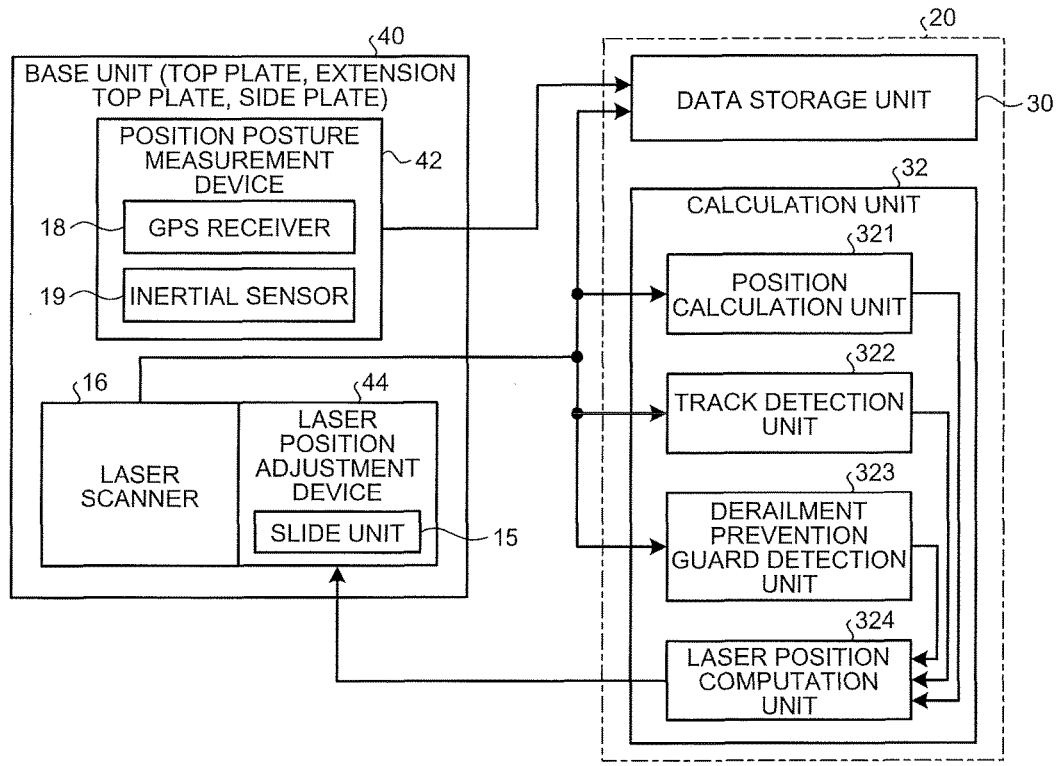
FIG. 7 is a block diagram illustrating a functional configuration of the rail position measurement device according to the first embodiment to which an automatic position adjustment function for a laser scanner is added.

Next, a function of a principal component of the rail position measurement device according to the first embodiment will be described. FIG. 7 is a block diagram illustrating a functional configuration of the rail position measurement device according to the first embodiment to which an automatic position adjustment function for the laser scanner 16 is added. As illustrated in FIG. 7, the automatic position adjustment function according to the first embodiment can be realized by the base unit 40 and a calculation unit 32 provided in the data processing unit 20.

The function of the base unit 40 can be divided into three functions: a position posture measurement device 42; the laser scanner 16; and a laser position adjustment device 44, as illustrated in FIG. 7. In FIG. 7, the position posture measurement device 42 is the function for obtaining the three-dimensional position and posture angle of the measurement vehicle 1, and it can be realized by using the GPS receiver 18 and the inertial sensor 19 exemplified in FIG. 1. The laser position adjustment device 44 only needs to be able to change the position of the laser scanner 16 in the up-down direction with respect to the space, and it can be realized by the slide unit 15 illustrated in FIG. 1.

The function of the calculation unit 32 can be divided into a position calculation unit 321; a track detection unit 322; a derailment prevention guard detection unit 323; and a laser position computation unit 324. The measurement result obtained by the laser scanner 16 is input to the data storage unit 30 and also input to the position calculation unit 321, the track detection unit 322, and the derailment prevention guard detection unit 323.

The position calculation unit 321 calculates the scanner position with respect to the rail 3 from the measurement information obtained by the laser scanner 16. In a case where the measurement vehicle 1 is installed on the road-rail truck 2, for example, the measurement vehicle 1 is not always installed on the same road-rail truck 2. Moreover, an installation part of the road-rail truck 2 might not be level. The scanner position with respect to the rail 3 is, therefore, preferably calculated using the measurement information obtained by the laser scanner 16.

The track detection unit 322 calculates the gauge of the rails 3 from the measurement information obtained by the laser scanner 16. However, if the accuracy of the displacement width of the gauge is within such a range that the position of the laser scanner 16 is not affected, the calculation of the gauge is not required.

A derailment prevention guard is sometimes provided on the rail 3 as illustrated in, for example, FIG. 9, which will be described later. The derailment prevention guard detection unit 323 detects the presence or absence of the derailment prevention guard from the measurement information obtained by the laser scanner 16. Further, some tracks do not have derailment prevention guards, and along the same track, some sections have derailment prevention guards, and other sections do not have derailment prevention guards. In a case where the sections having derailment prevention guards are known in advance, the derailment prevention guard detection unit 323 does not need to be provided.

The laser position computation unit 324 computes a position on the base unit 40 at which the laser scanner 16 should be arranged and that is suitable for the measurement of the rail 3 (hereinafter referred to as a "scanner position" as necessary) at least on the basis of the calculation result from the position calculation unit 321 and, if necessary, in combination with the calculation result from at least one of the track detection unit 322 and the derailment prevention guard detection unit 323. The laser position computation unit 324 also computes the movement amount or the scanner position of the laser scanner 16. The laser position computation unit 324 then transmits the computation result to the laser position adjustment device 44. The laser position adjustment device 44 controls the position of the laser scanner 16 on the basis of the transmitted information on the movement amount or the scanner position of the laser scanner 16.

Figure 8:
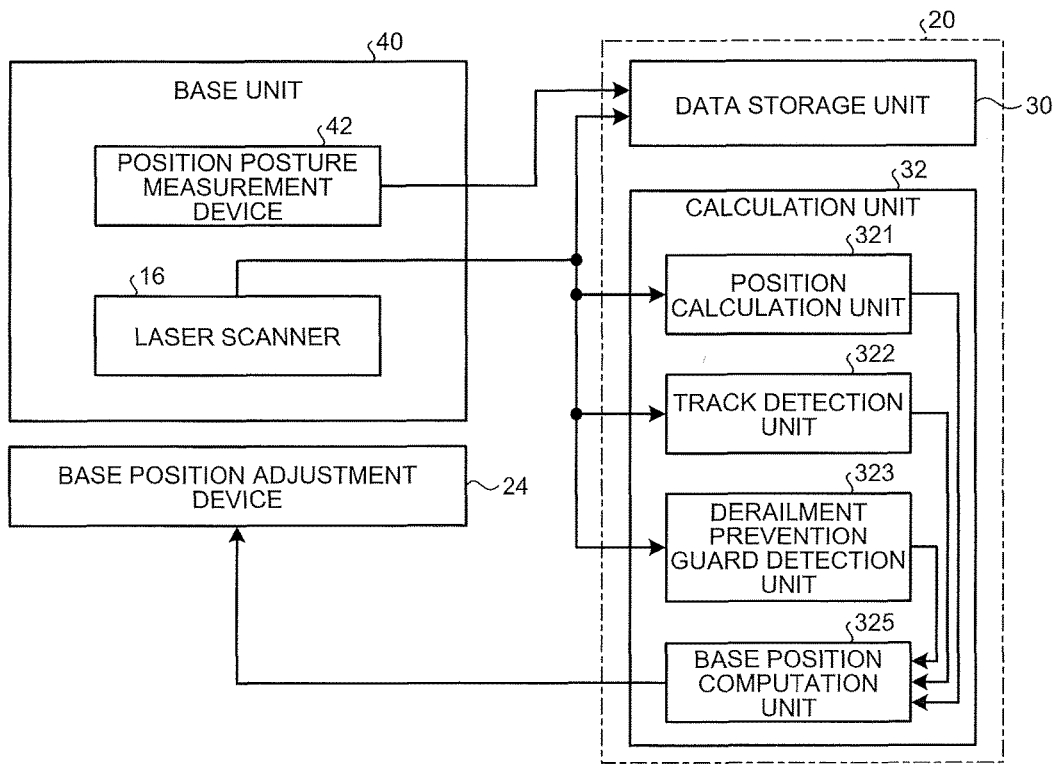
FIG. 8 is a block diagram illustrating a functional configuration of the rail position measurement device according to the first embodiment in which the automatic position adjustment for the laser scanner is realized by a base position adjustment device.

FIG. 8 is a block diagram illustrating a functional configuration of the rail position measurement device according to the first embodiment in which the automatic position adjustment for the laser scanner 16 is realized by the base position adjustment device 24. In the case of a configuration having the base position adjustment device 24, the base position adjustment device 24 carries out the function of the laser position adjustment device 44. As illustrated in the calculation unit 32 in FIG. 8, a base position computation unit 325 is provided in place of the laser position computation unit 324 provided in FIG. 7. In other words, the base position computation unit 325 is a component that carries out the function of the laser position computation unit 324. The other components in the calculation unit 32 are the same as or equivalent to those in FIG. 7 and denoted by the same reference signs. Overlapping descriptions will be omitted.

The base position computation unit 325 computes the position of the laser scanner 16 on the base unit 40 at least on the basis of the calculation result from the position calculation unit 321 and, if necessary, in combination with the calculation result from at least one of the track detection unit 322 and the derailment prevention guard detection unit 323. The base position computation unit 325 also computes the movement amount or the movement position of the top plate 12. The base position computation unit 325 then transmits the computation result to the base position adjustment device 24 as control information. The base position adjustment device 24 controls the position of the top plate 12 on the basis of the transmitted information on the movement amount or the movement position of the top plate 12.

Next, an irradiation position of the laser scanner 16 at which the rail position measurement device according to the first embodiment measures the position of the rail 3 will be examined from a geometric point of view with reference to some drawings.

Figure 9:
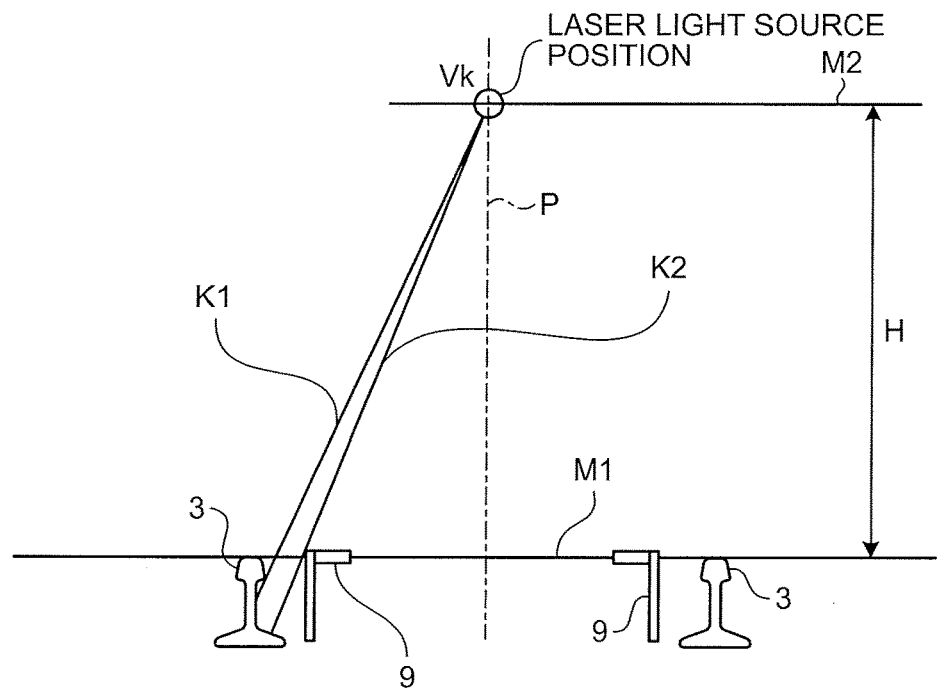
FIG. 9 is a diagram explaining the effect of a derailment prevention guard on the irradiation position of the laser scanner.

FIG. 9 is a diagram explaining the effect of a derailment prevention guard 9 on the irradiation position of the laser scanner 16. In FIG. 9, the circle mark illustrated on the upper portion represents the position of the laser scanner 16 (hereinafter referred to as a "laser light source position"). The laser light source position is located at a point having a height H on a vertical line P extending from an intermediate point (hereinafter referred to as a "track center") between one rail 3 and the other rail 3. The height H is the distance between a rail plane M1 and a laser light source position plane M2. The rail plane M1 is a plane connecting the one rail 3 to the other rail 3, and the laser light source position plane M2 includes the laser light source position Vk and is parallel with the rail plane M1.

As illustrated in the drawing, the derailment prevention guard 9 is provided between the one rail 3 and the other rail 3. In this regard, when a side surface of the rail is segmented into a head, a web, and a bottom, then, in the presence of the derailment prevention guard 9, the laser irradiation position needs to be adjusted such that the laser light reaches the web of the side surface of the rail (hereinafter referred to as a "rail web" or simply a "web") and the bottom of the side surface of the rail (hereinafter referred to as a "rail bottom" or simply a "bottom"). Note that a straight line K1 represents a laser optical path for measuring the highest point of the rail web, and a straight line K2 represents a laser optical path for measuring the lowest point of the rail bottom. In other words, FIG. 9 means that even when the derailment prevention guard 9 is provided, there is still a laser irradiation position at which the rail web and the rail bottom can be measured.

As described above, the rail position measurement device according to the first embodiment includes the movable mechanism that enables the position of the laser scanner to be moved in the up-down direction. Therefore, the laser scanner can be moved to a position where the rail web and the rail bottom can be measured, and the position and the shape of the rail can be measured with a high degree of accuracy.

In addition, the rail position measurement device according to the first embodiment is configured to calculate the position of the laser scanner on the basis of the measurement information from the laser scanner, and it is configured to be able to adjust the position of the laser scanner on the basis of the calculation result. Therefore, the position of the laser scanner can be adjusted while the measurement vehicle is running, and thus the measurement of the rail position can be efficiently performed.

The movable mechanism that enables the laser scanner to be moved in the up-down direction may be configured in such a manner that a slide mechanism in the up-down direction is provided on a structure directly equipped with the laser scanner.

The movable mechanism that enables the laser scanner to be moved in the up-down direction may be an adjustment device connected to a structure equipped with the laser scanner and configured to be able to move a structure equipped with the positioning sensor in the up-down direction.

Second Embodiment

Next, a rail position measurement device according to a second embodiment will be described. The rail position measurement device according to the first embodiment is configured such that the automatic position adjustment for the laser scanner 16 is performed only in the up-down direction along the installation surface of the laser scanner 16. In the rail position measurement device according to the second embodiment, however, in addition to the up-down direction, a movable mechanism in a horizontal direction along the installation surface, i.e., a direction orthogonal to both the travelling direction and the up-down direction, is provided. The basic configuration of the rail position measurement device according to the second embodiment is equivalent to that illustrated in FIGS. 1 and 5. The functions of the rail position measurement device according to the second embodiment are equivalent to those illustrated in FIG. 7.

Figure 10:
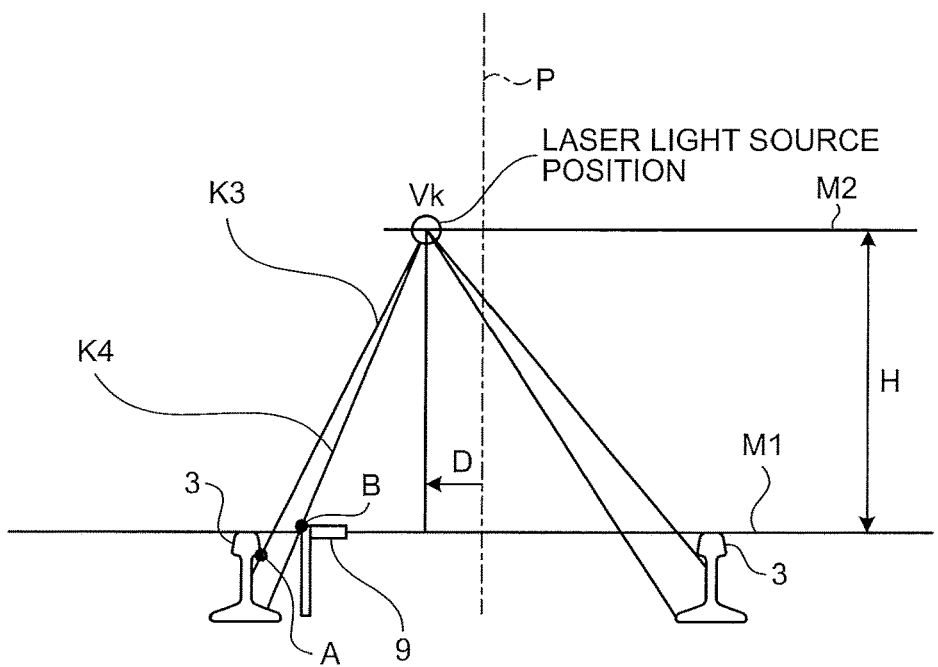
FIG. 10 is a diagram explaining a laser light source position that is preferable when the derailment prevention guard is provided on only one rail side.

FIG. 10 is a diagram explaining a laser light source position that is preferable when the derailment prevention guard 9 is provided on only one rail side. As is clear from a comparison between FIGS. 10 and 9, in a case where the derailment prevention guard 9 is provided on only one rail side, the laser scanner 16 is preferably arranged on the side with the derailment prevention guard 9. In the example in FIG. 10, the laser scanner 16 is arranged at a position moved by a distance D from the vertical line P on the track center toward the side with the derailment prevention guard 9. In this case, a straight line K4 that is a laser optical path for measuring the lowest point of the rail bottom is less affected by an interruption caused by point B that is a corner of the derailment prevention guard 9 than in FIG. 9. Therefore, the number of irradiation points for the rail bottom is increased, whereby irradiation density can be enhanced, and the measurement can be performed with a higher degree of accuracy. However, if the distance D is increased too much, the angle of a straight line K3 becomes steeper, assuming that the straight line K3 is a laser optical path connecting the laser light source position Vk to point A that is the lowermost point of a rail head side surface. Consequently, the number of irradiation points for the rail web is reduced, which is not preferable. This means, when viewed from the opposite side, that the laser light source position Vk only needs to be determined on the basis of the distance between the rail 3 and the derailment prevention guard 9, the height of the derailment prevention guard 9, and the shapes of the head, web, and bottom of the rail 3.

Further, it is possible to consider changing the position of the single laser scanner to perform the measurement multiple times although it is not directly associated with the movable mechanism in the horizontal direction according to the second embodiment. However, because the measurement that is performed by the single laser scanner multiple times is likely to be affected by an error of the GPS, such measurement is not preferable when the GPS receiver is used as the positioning sensor.

In contrast to the measurement that is performed by the single laser scanner multiple times, it is possible to consider using two laser scanners on different installation positions to perform the measurement at a time. However, because the use of the two laser scanners leads to a cost increase, such measurement is not preferable in terms of the cost. In a case where the two laser scanners are used, the effect of an attachment error between the two laser scanners might become large. Therefore, such measurement is disadvantageous in that alignment needs to be established accurately so that the measurement is not affected by the attachment error. Therefore, it can be concluded that arranging the single laser scanner at a preferable position in the horizontal direction and performing the measurement once by means of the single laser scanner is a more preferable embodiment, as in the second embodiment.

As described above, the rail position measurement device according to the second embodiment includes the movable mechanism that enables the laser scanner to be moved in the up-down direction and the direction orthogonal to both the up-down direction and the travelling direction. Therefore, for example, even when the derailment prevention guard is provided on one side, the irradiation density for the rail bottom and the rail web can be favorably distributed between the rail on the side where the derailment prevention guard is provided and the rail on the side where the derailment prevention guard is not provided. Thus, the position of the rail can be effectively measured with a high degree of accuracy.

Third Embodiment

Figure 11:
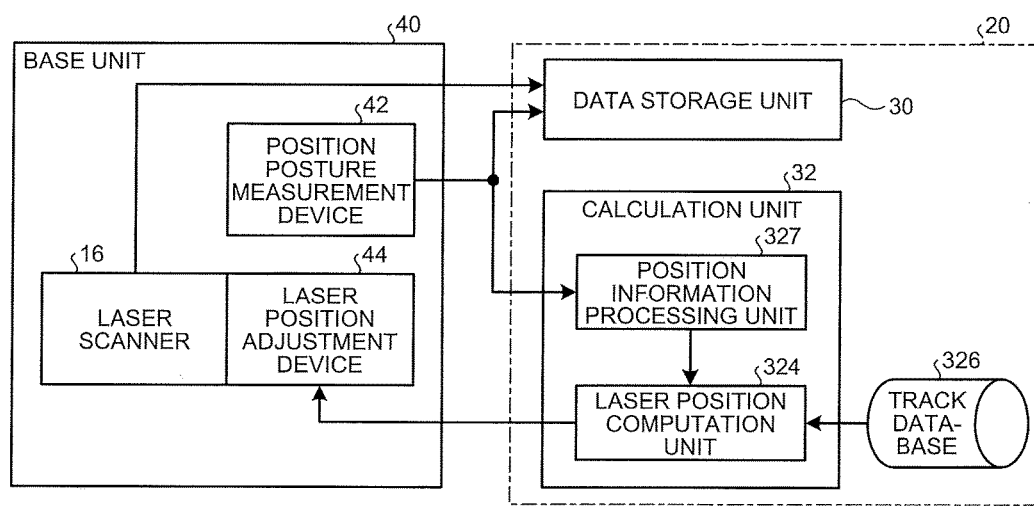
FIG. 11 is a block diagram illustrating an exemplary functional configuration of a rail position measurement device according to a third embodiment.

Next, a rail position measurement device according to a third embodiment will be described. FIG. 11 is a block diagram illustrating an exemplary functional configuration of the rail position measurement device according to the third embodiment. The configuration illustrated in FIG. 11 corresponds to the functional blocks illustrated in FIG. 7. The basic configuration of the rail position measurement device having the functions illustrated in FIG. 11 is equivalent to that illustrated in FIGS. 1 and 5.

Differences between the functional configuration illustrated in FIG. 11 and that in FIG. 7 are in the configuration of the data processing unit 20 and the flow of the data exchange between a base unit 40 and the data processing unit 20. In FIG. 11, instead of the configuration having the position calculation unit 321, the track detection unit 322, and the derailment prevention guard detection unit 323, a position information processing unit 327 is provided in the calculation unit 32. In the data processing unit 20, a track database 326 that holds track data is provided. The configuration of the base unit 40 is the same as or equivalent to that in FIG. 7, and it is denoted using the same reference signs. Overlapping descriptions will be omitted.

The track database 326 stores the track data including gauge information for a position along the track and information on the presence or absence of a derailment prevention guard along a running track. The position information processing unit 327 calculates a current position scanned by the laser scanner 16 on the basis of the measurement information on the position posture measurement device 42, and it outputs the calculation result to the laser position computation unit 324. The laser position computation unit 324 refers to the track database 326 to obtain gauge information and information on the presence or absence of a derailment prevention guard at the current measurement position. The laser position computation unit 324 then calculates a preferable arrangement position of the laser scanner 16 for measuring the rail 3, and it outputs the information on the calculated arrangement position to the laser position adjustment device 44. The laser position adjustment device 44 controls the movement of the laser scanner 16 such that the laser scanner 16 is arranged at the calculated preferable arrangement position. In relation to the preferable arrangement position, only the movement in the up-down direction is considered in the rail position measurement device of the first embodiment. Needless to say, however, the movement in the horizontal direction as well as the up-down direction is considered by the rail position measurement device of the third embodiment.

Figure 12:
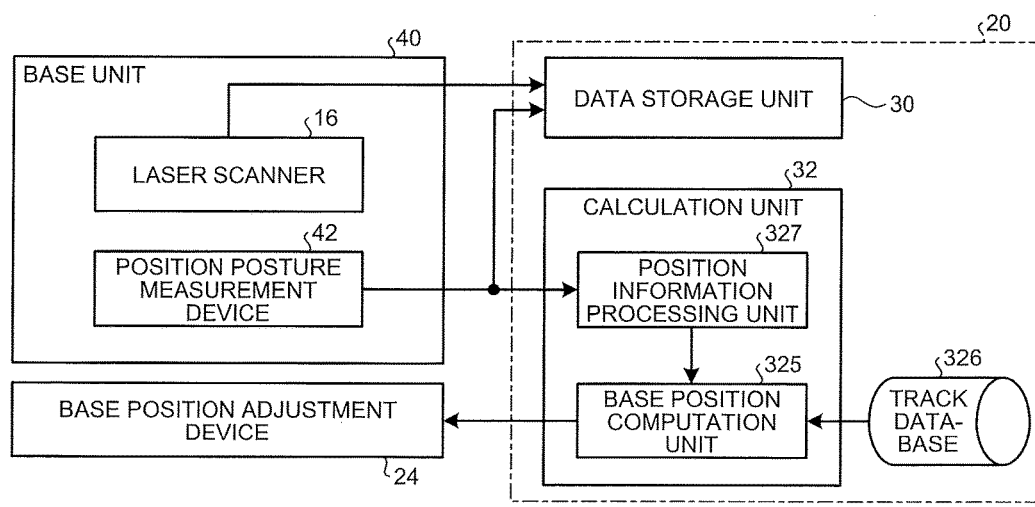
FIG. 12 is a block diagram illustrating another exemplary functional configuration of the rail position measurement device according to the third embodiment.

FIG. 12 is a block diagram illustrating another exemplary functional configuration of the rail position measurement device according to the third embodiment. The configuration illustrated in FIG. 12 corresponds to the functional blocks illustrated in FIG. 8. The difference between the configuration of the data processing unit 20 illustrated in FIG. 12 and that in FIG. 11 is that the laser position computation unit 324 of the calculation unit 32 is replaced by the base position computation unit 325. The base position computation unit 325 refers to the track database 326 in order to obtain gauge information and information on the presence or absence of a derailment prevention guard at the current measurement position. The base position computation unit 325 then calculates a preferable arrangement position for the laser scanner 16 for measuring the rail 3, and it calculates base position information for moving the laser scanner 16 to the calculated preferable arrangement position. The base position computation unit 325 then outputs the base position information to the base position adjustment device 24. The base position adjustment device 24 controls the movement of the top plate 12 such that the laser scanner 16 is arranged at the preferable arrangement position.

As described above, the rail position measurement device according to the third embodiment is configured to calculate a preferable arrangement position for the laser scanner on the basis of the track data including gauge information for a position along the track and information on the presence or absence of a derailment prevention guard. Therefore, the laser scanner can be moved to a position where the rail web and the rail bottom can be measured, and thus the position and the shape of the rail can be measured with a high degree of accuracy.

In addition, the rail position measurement device according to the third embodiment is configured to utilize track data. Therefore, the configuration of the calculation unit can be made more compact than that of the first embodiment or the second embodiment, and the processing speed of the calculation unit is increased. As a result, it is possible to obtain such an effect that an effect on the measurement accuracy can be reduced.

The configurations illustrated in the above-mentioned first to third embodiments are examples of the configuration of the present invention. It is obvious that the configurations can be combined with other publicly known technologies and the configurations can be changed, for example, by omitting parts thereof and combining parts thereof without departing from the scope of the present invention.

Figure 13:
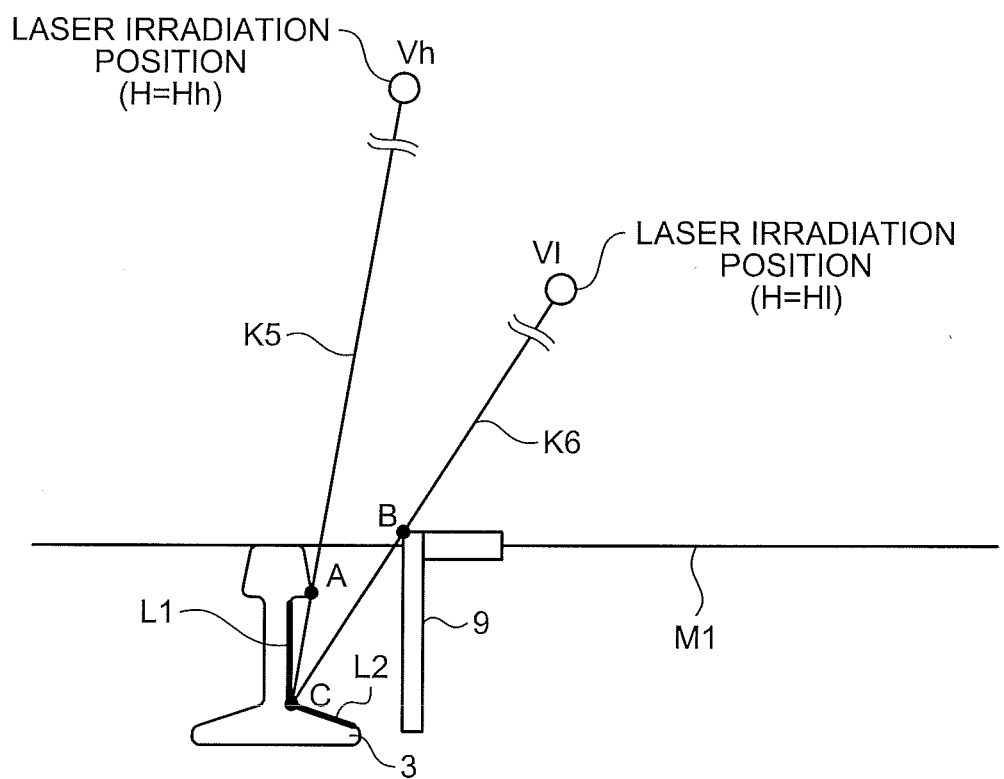
FIG. 13 is a diagram for analyzing in further detail laser irradiation positions in the presence of the derailment prevention guard.

From this paragraph, the laser irradiation position in the presence of the derailment prevention guard 9 will be further examined geometrically. FIG. 13 is a diagram examining the laser irradiation positions in the presence of the derailment prevention guard 9. In FIG. 13, components which are the same as or equivalent to those in FIG. 10 are denoted by the same reference signs.

In FIG. 13, point A is the lowermost point of a rail head side surface, point B is a rail side upper corner point of the derailment prevention guard 9, and point C is the uppermost point of a rail bottom side surface. In this regard, point Vh located on an extension of a straight line K5 represents a laser irradiation position having a height Hh and located on a laser optical path for enabling the measurement of the uppermost point C of the rail bottom side surface. Point Vl located on an extension of a straight line K6 represents a laser irradiation position having a height Hl and located on a laser optical path for enabling the measurement of the uppermost point C of the rail bottom side surface. Therefore, the height H of the point Vh of the laser irradiation position being equal to or greater than Hh means that the rail web cannot be measured, and the height H of the point Vl of the laser irradiation position being equal to or less than Hl means that the rail bottom cannot be measured.

Once the point Vh of the laser irradiation position and the point Vl of the laser irradiation position mentioned above are obtained, and when measurement points are obtained for a contour L1 of the rail web and a contour L2 of the rail bottom within almost the same length range, accurate position alignment can be performed in both a height direction and a width direction of the cross section of the rail, and the measurement accuracy can be improved.

Over the entire length of the contour L1 of the rail web, if 50% or more of the measurement points are obtained from the uppermost point C of the rail bottom side surface, the contour L1 of the rail web can be estimated. If 70% or more of the measurement points are obtained from the uppermost point C of the rail bottom side surface, the contour L1 of the rail web can be estimated with a high degree of accuracy. With regard to the contour L1 of the rail web, a thick line part in the drawing which is regarded as a straight line part can be the entire length of the contour L1 of the rail web.

Over the entire length of the contour L2 of the rail bottom, if 50% or more of the measurement points are obtained from the uppermost point C of the rail bottom side surface, the contour L2 of the rail bottom can be estimated. If 70% or more of the measurement points are obtained from the uppermost point C of the rail bottom side surface, the contour L2 of the rail bottom can be estimated with a high degree of accuracy. With regard to the contour L2 of the rail bottom, in the same way as the rail web, a thick line part in the drawing that is regarded as a straight line part can be the entire length of the contour L2 of the rail bottom.

Figure 14:
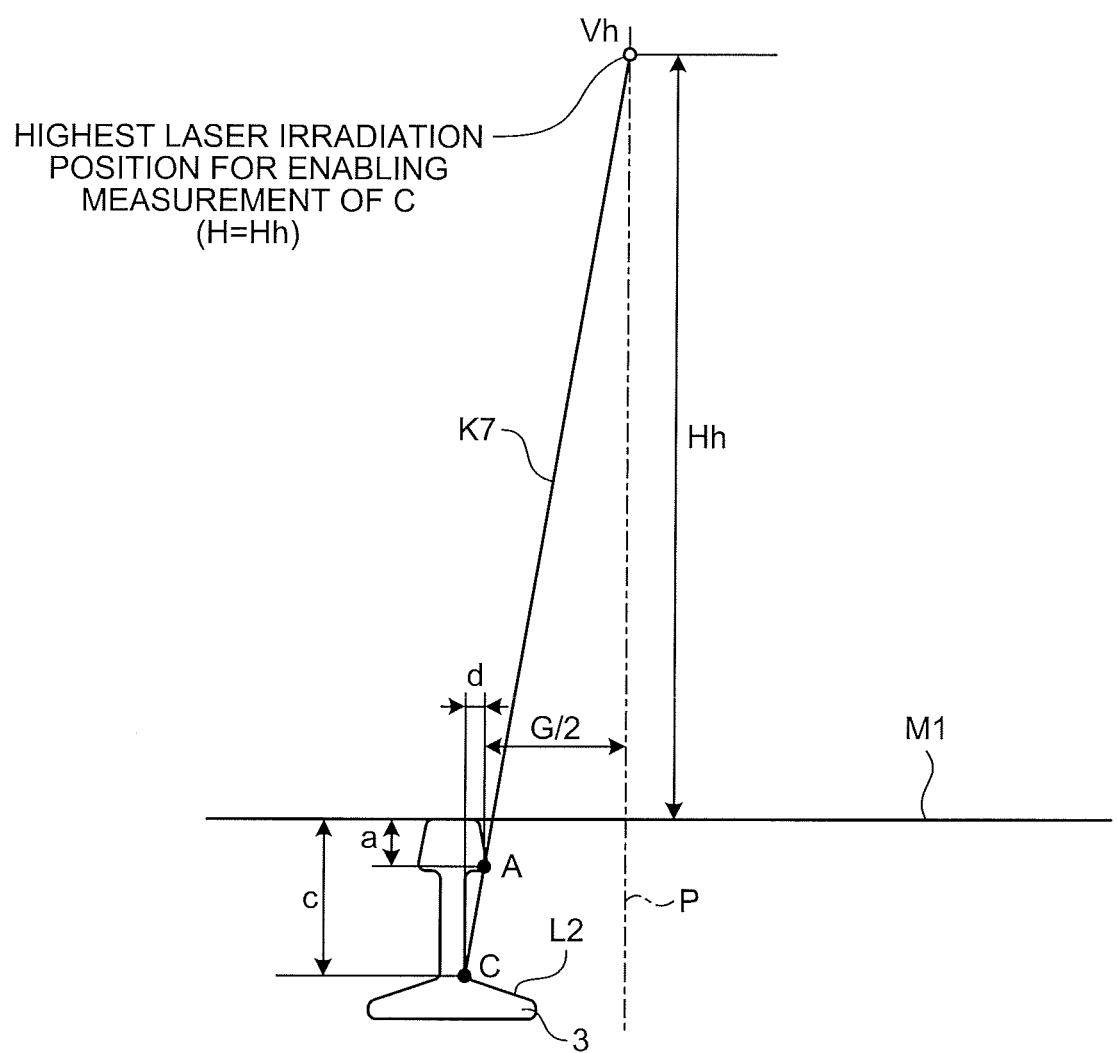
FIG. 14 is a diagram examining in further detail the laser irradiation position Vh illustrated in FIG. 13.

FIG. 14 is a diagram examining in further detail the laser irradiation position Vh illustrated in FIG. 13. In FIG. 14, the point Vh located on an extension of a straight line K7 means a laser irradiation position located on the vertical line P on the track center represented by a dashed-dotted line and located at the highest position on a laser optical path for enabling the measurement of the uppermost point C of the rail bottom side surface. In this regard, the distance in a rail width direction between the uppermost point C of the rail bottom side surface and the lowermost point A of the rail head side surface is denoted by d. The distance in a vertical direction between the lowermost point A of the rail head side surface and the rail plane M1 is denoted by a. The distance in the vertical direction between the uppermost point C of the rail bottom side surface and the rail plane M1 is denoted by c. The distance between the rails (hereinafter referred to as a "gauge distance") is denoted by G. The height of the laser irradiation position is denoted by Hh. In this case, the height Hh of the laser irradiation position can be represented by the following formula using these d, a, c G, and Hh.

$$Hh=\{(c-a)\cdot(G/2)/d\}-a \qquad (1)$$

Figure 15:
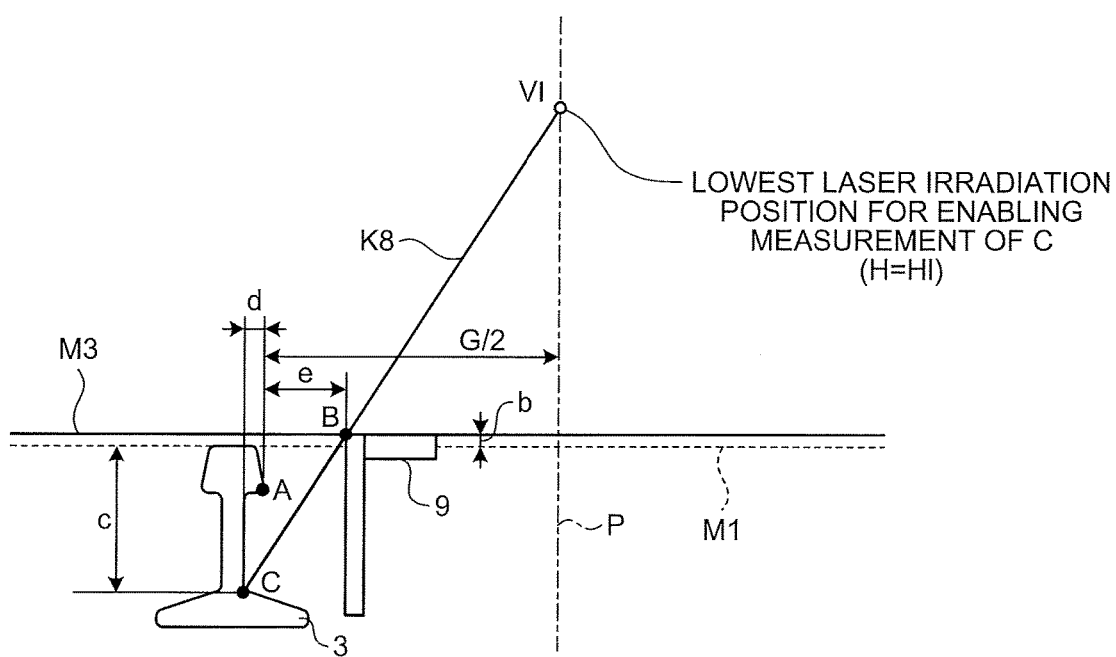
FIG. 15 is a diagram examining in further detail the laser irradiation position Vl illustrated in FIG. 13.

FIG. 15 is a diagram examining in further detail the laser irradiation position V1 illustrated in FIG. 13. In FIG. 15, components that are the same as or equivalent to those in FIGS. 13 and 14 are denoted by the same reference signs. In FIG. 15, the point V1 located on an extension of a straight line K8 means a laser irradiation position located on the vertical line P on the track center and located at the lowest position on a laser optical path for enabling the measurement of the uppermost point C of the rail bottom side surface. In this regard, a plane passing through the rail side upper corner point B of the derailment prevention guard 9 and in parallel with the rail plane M1 is called a derailment prevention guard plane M3. The distance between the rail plane M1 and the derailment prevention guard plane M3 is denoted by b, and the distance between the lowermost point A of the rail head side surface and the rail side upper corner point B is denoted by e. Then, the height Hl of the laser irradiation position V1 can be represented by the following formula using d, c, and G defined in FIG. 14 as well as b and e defined here.

$$Hl=\{(b+c)\cdot(G/2-e)/(d+e)\}+b \qquad (2)$$

Figure 16:
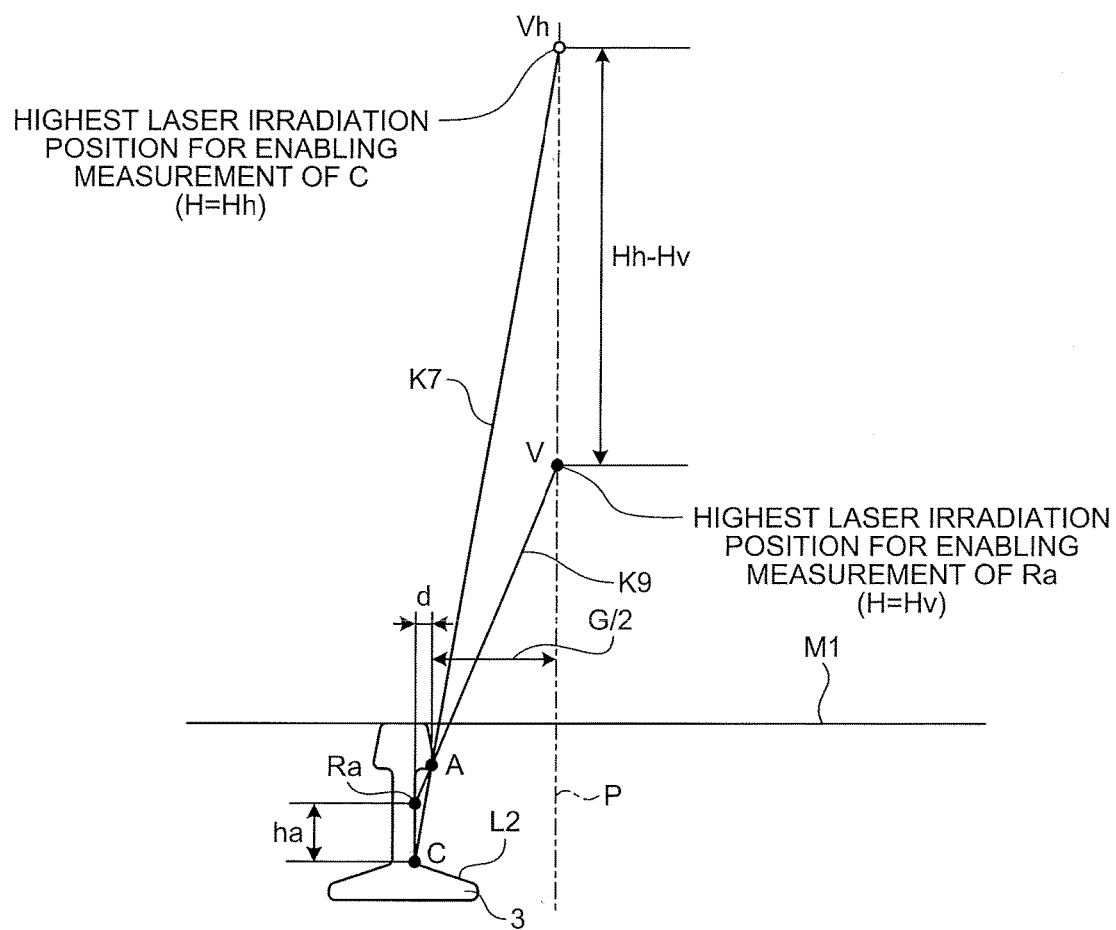
FIG. 16 is a diagram illustrating a relation between a measurement range of a rail web and a range of the height of the laser irradiation position.

FIG. 16 is a diagram illustrating a relation between a measurement range of the rail web and a range of the height of the laser irradiation position. In FIG. 16, components that are the same as or equivalent to those illustrated in any of FIGS. 13 to 15 are denoted by the same reference signs. In FIG. 16, point Ra is a point located at a height ha from the uppermost point C of the rail bottom side surface when the measurement range of the rail web is ha. Point V is located on an extension of a straight line K9 connecting the point Ra to the lowermost point A of the rail head side surface and located at a height Hv on the vertical line P on the track center. The point V means a laser irradiation position at which the measurement range is ha. Then, the measurement range ha in the rail web can be represented by the following formula using d, G, and Hh defined in any of FIGS. 13 to 15 as well as the height Hv of the laser irradiation position V defined here.

$$ha=(Hh-Hv)\cdot d/(G/2) \qquad (3)$$

Figures 17, 18:
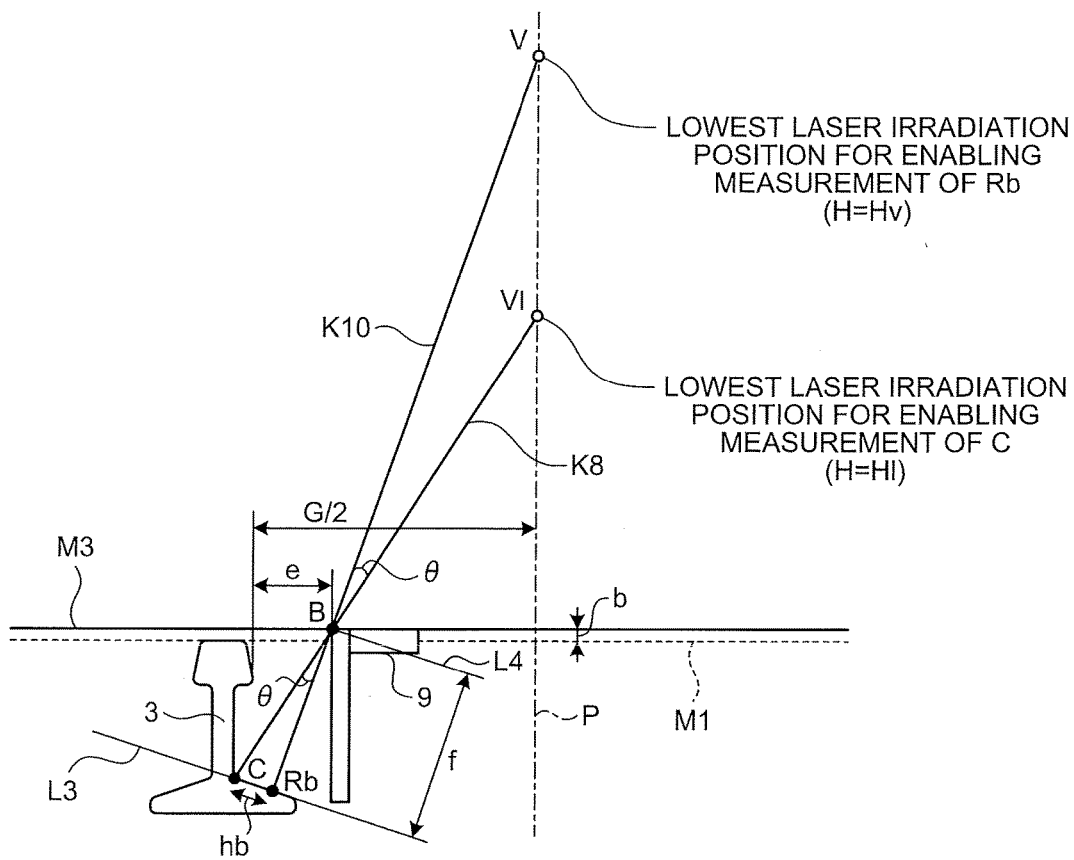
FIG. 17 is a diagram illustrating a relation between a measurement range of a rail bottom and a range of the height of the laser irradiation position.
FIG. 18 is a diagram illustrating exemplary values of variables a, c, and d for major rails.

FIG. 17 is a diagram illustrating a relation between a measurement range of the rail bottom and a range of the height of the laser irradiation position. In FIG. 17, components that are the same as or equivalent to those illustrated in any of FIGS. 13 to 15 are denoted by the same reference signs. In FIG. 17, point Rb is a point located at a distance hb from the uppermost point C of the rail bottom side surface when the measurement range of the rail bottom is hb. Point V is located on an extension of a straight line K10 connecting the point Rb to the rail side upper corner point B of the derailment prevention guard 9 and located at a height Hv on the vertical line P on the track center. The point V means a laser irradiation position at which the measurement range is hb. In this regard, the distance between a contour L3 of the rail bottom and a straight line L4 passing through the rail side upper corner point B and in parallel with the contour L3 is denoted by f. The smaller one of the angles between the straight line K8 and the straight line K10 is denoted by θ. In this case, the measurement range hb in the rail bottom can be represented by the following formula using b, G, and Hl defined in any of FIGS. 13 to 17 as well as the height Hv of the laser irradiation position V defined here.

$$hb=f\theta$$

$$\theta=\tan^{-1}\{(Hv-b)/(G/2-e)\}-\tan^{-1}\{(Hl-b)/(G/2-e)\} \qquad (4)$$

FIG. 18 is a diagram illustrating exemplary values of the variables a, c, and d for major rails. In FIG. 18, the major rails are a 60 kg rail for a bullet train and a 50 kgN rail for a conventional line. An arbitrary numerical value included in a standard value of the cross section of the rail is set for each of the numerical values illustrated in FIG. 18. Needless to say, the present invention is not limited to these numerical values. The same applies to the following exemplary numerical values.

Figures 19, 20:
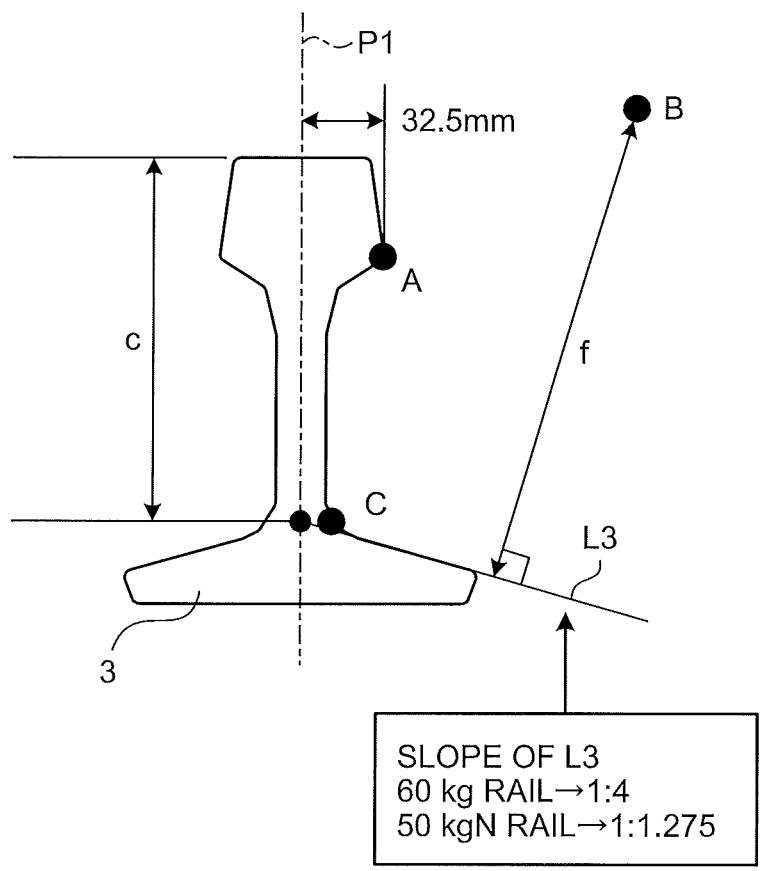
FIG. 19 is a diagram illustrating exemplary values of variables b and e for the derailment prevention guard.
FIG. 20 is a diagram illustrating the shape of a cross section of a rail that is used as a basis for the computation results illustrated in FIGS. 22 to 24.
Figures 21, 22:
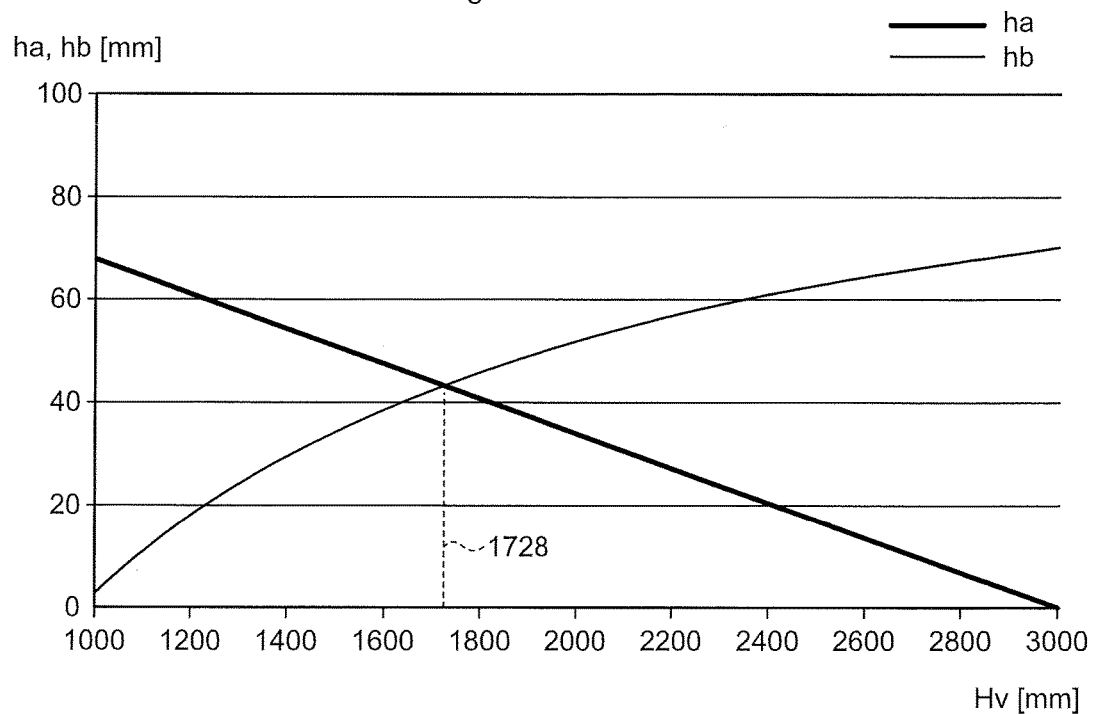
FIG. 21 is a diagram illustrating exemplary values of a variable f associated with the values of the variables in FIGS. 18 and 19.
FIG. 22 is a diagram illustrating an exemplary computation result (standard gauge, 60 kg rail) for the measurement ranges ha and hb.

FIG. 19 is a diagram illustrating exemplary values of the variables b and e for the derailment prevention guard. FIG. 20 is a diagram illustrating the shape of the cross section of the rail that is used as a basis for the computation results illustrated in FIGS. 22 to 26. FIG. 21 is a diagram illustrating exemplary values of the variable f associated with the values of the variables in FIGS. 18 and 19. As illustrated in FIG. 20 as well, the following computation is performed on the assumption that the distance measured from a center line P1 of the cross section of the rail to the lowermost point A of the rail head side surface is 32.5 mm, and the slope of the rail bottom contour L3 is 1:4 for the 60 kg rail and 1:1.275 for the 50 kgN rail.

Figure 23:
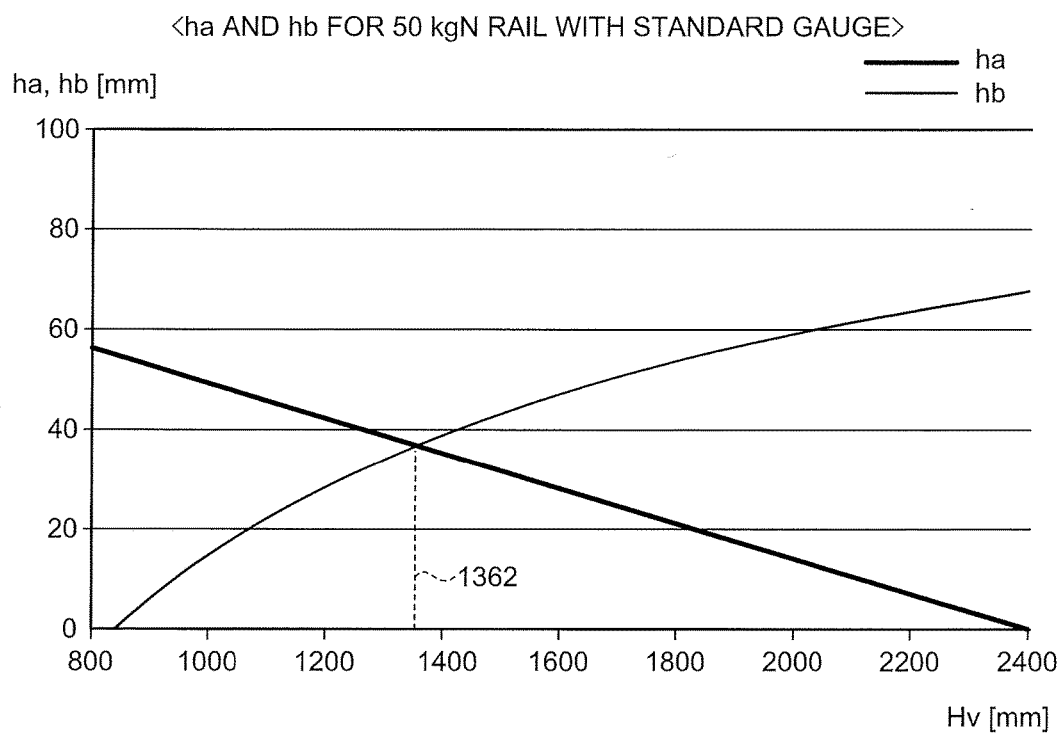
FIG. 23 is a diagram illustrating an exemplary computation result (standard gauge, 50 kgN rail) for the measurement ranges ha and hb.
Figure 24:
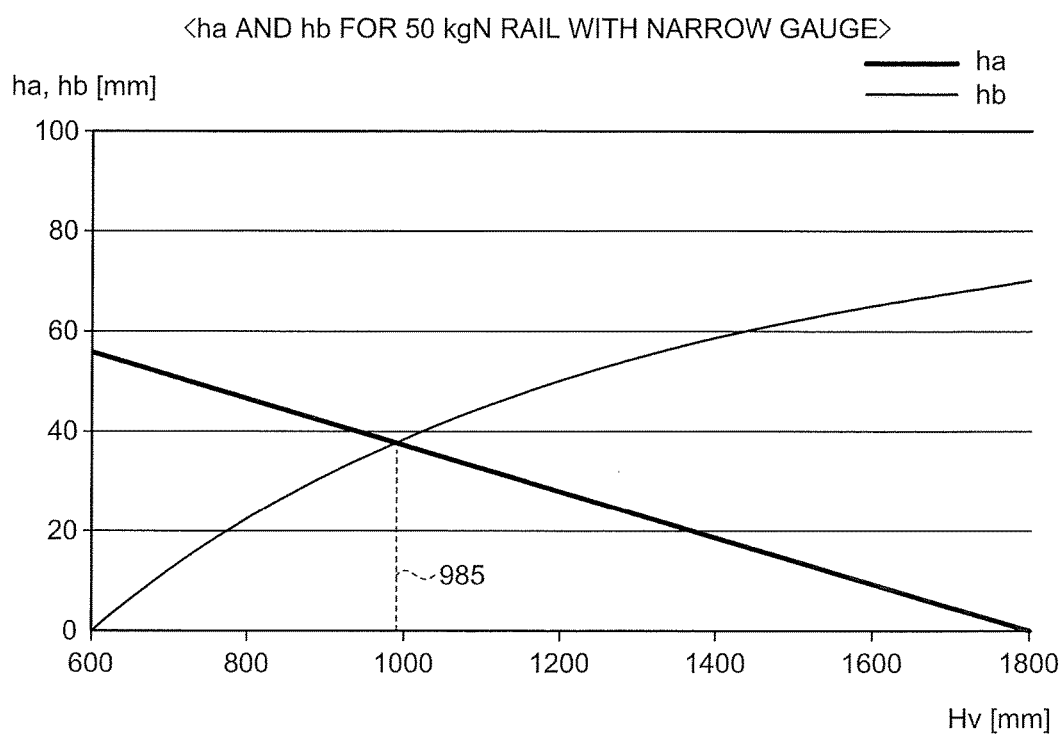
FIG. 24 is a diagram illustrating an exemplary computation result (narrow gauge, 50 kgN rail) for the measurement ranges ha and hb.
Figures 25, 26:
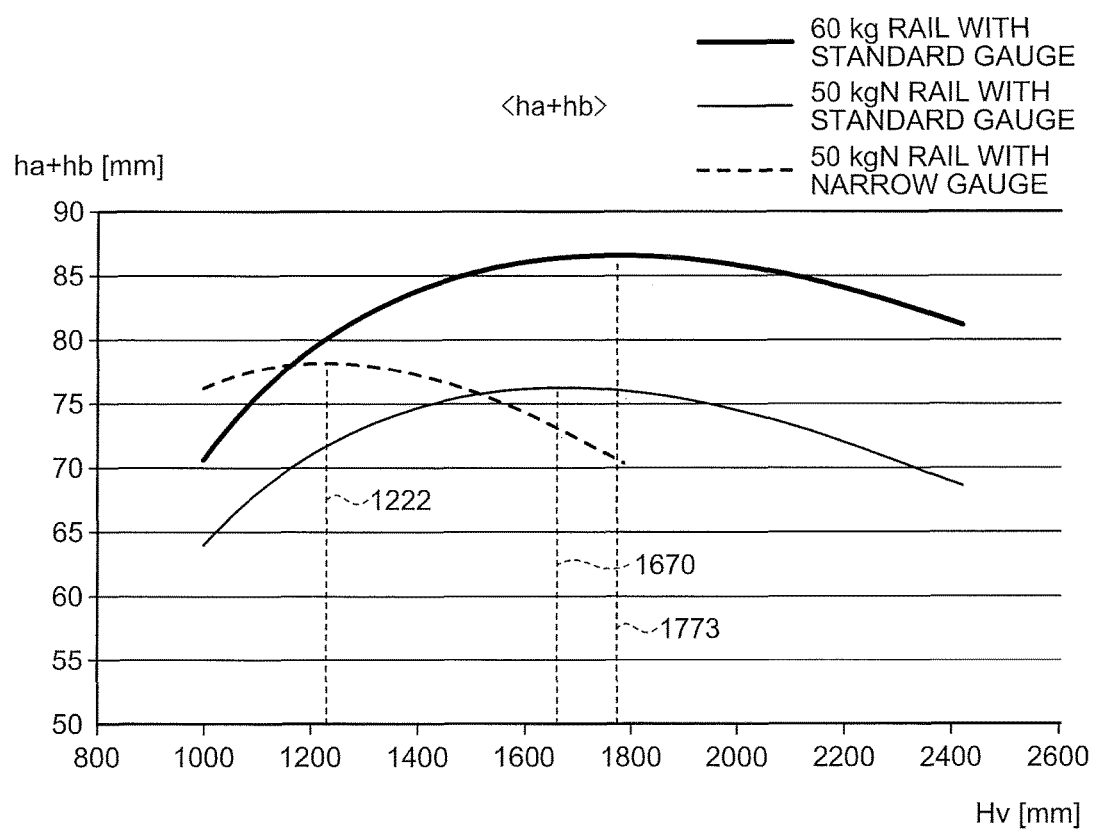
FIG. 25 is a diagram comparing the respective sums of the measurement ranges ha and the corresponding measurement ranges hb in FIGS. 22 to 24.
FIG. 26 is a diagram illustrating values of Hv that satisfy ha=hb and values of Hv that maximize ha+hb.

FIGS. 22 to 25 are diagrams (graphs) illustrating computation results of computing ha, hb, and Hv with the use of the respective exemplary numerical values illustrated in FIGS. 18 to 21. The measurement ranges ha and hb (refer to FIGS. 16 and 17) for the 60 kg rail with a standard gauge are illustrated in FIG. 22. The measurement ranges ha and hb for the 50 kgN rail with the standard gauge are illustrated in FIG. 23. The measurement ranges ha and hb for the 50 kgN rail with a narrow gauge are illustrated in FIG. 24. Among them, in each of FIGS. 22 to 24, a horizontal axis represents the laser irradiation position Hv, and a vertical axis represents the measurement ranges ha (thick solid line) and hb (thin solid line). In FIG. 25, the respective sums of the measurement ranges ha and the corresponding measurement ranges hb in FIGS. 22 to 24 are illustrated in comparison with one another.

As illustrated in each of FIGS. 22 to 24, there is a contradicting relation between the measurement range ha and the measurement range hb. In other words, if one increases, the other decreases, and if one decreases, the other increases. Therefore, a value of Hv that satisfies ha=hb exists between the measurement range ha and the measurement range hb, and as illustrated in FIG. 25, a value of Hv that maximizes their sum (=ha+hb) also exists. FIG. 26 is a diagram illustrating these values in the form of a table, in which (1) has the values of the height Hv that satisfy ha=hb, and (2) has the values of the height Hv that maximize ha+hb.

Both (1) and (2) mentioned above are examples that provide the appropriate laser irradiation positions, and both of them have advantages.

In a case where the example (1), namely, the value of Hv that satisfies ha=hb, is selected, the measurement points can be obtained, over almost the same length, for the contour in the horizontal direction of the rail bottom of the cross section of the rail and the contour in the up-down direction of the rail web of the cross section of the rail. Therefore, the example (1) is effective in the position alignment of the rail in the up-down direction (vertical direction) and a left-right direction (horizontal direction). For example, by means of only a contour part in the up-down direction of the rail web, vertically successive measurement points are obtained. In this case, the position in the left-right direction is clearly defined, but the position in the up-down direction might not be defined. In contrast, by means of only a ridge line part in the horizontal direction of the rail bottom, horizontally successive measurement points are obtained. In this case, the position in the up-down direction is clearly defined, but the position in the left-right direction might not be defined. Moreover, when only one side is short, the measurement points are reduced and likely to be exposed to the effect of noise. As is obvious from the above, when the value of Hv that satisfies ha=hb is selected, it is possible to obtain such an effect that a balance between a lateral direction and a longitudinal direction is improved, the position alignment is facilitated, and resistance to noise is strong.

In a case where the example (2), namely, the value of Hv that maximizes ha+hb, is selected, it means that more measurement points can be obtained. The more measurement points there are, the more facilitated the position alignment is and the stronger the resistance to noise becomes. Therefore, it is possible to obtain such an effect that the measurement accuracy is improved.

Figure 27:
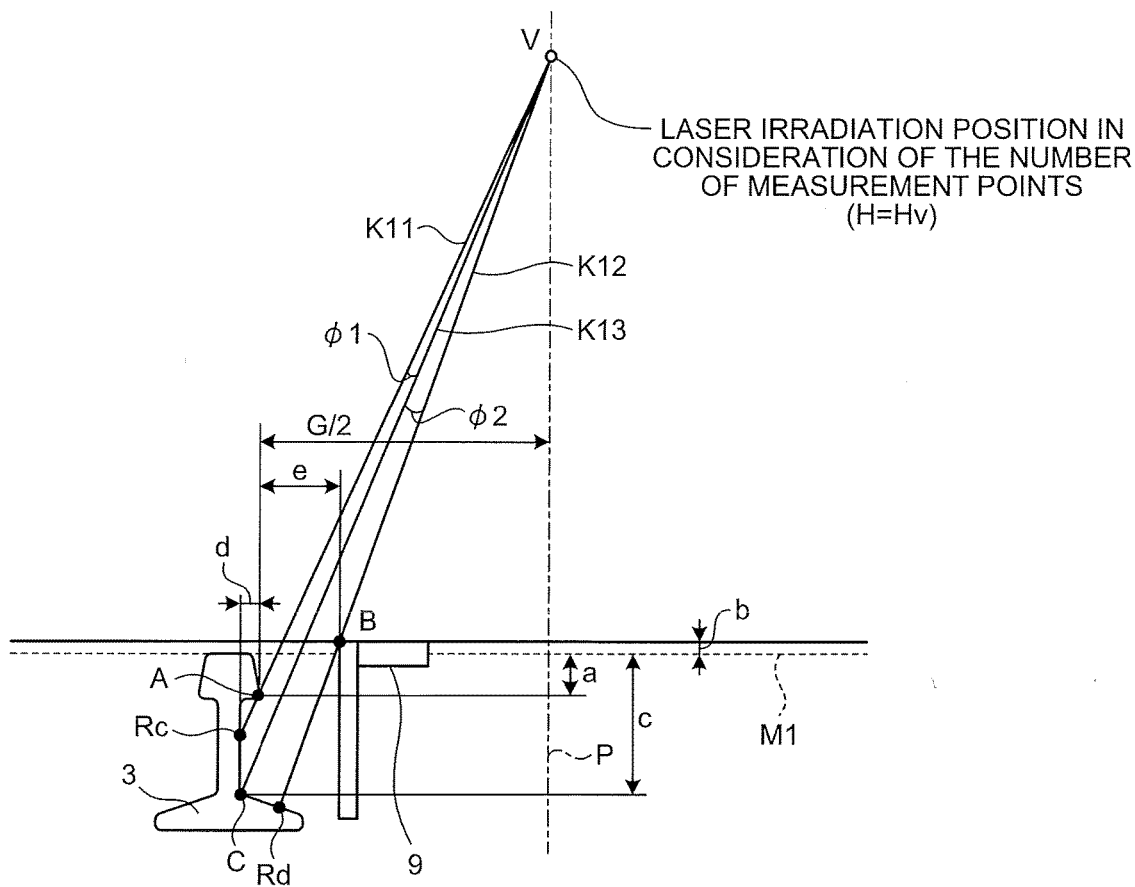
FIG. 27 is a diagram examining the laser irradiation position for measuring the rail web and bottom in terms of the number of measurement points.

FIG. 27 is a diagram examining the laser irradiation position for measuring the rail web and bottom in terms of the number of measurement points. In FIG. 27, components that are the same as or equivalent to those illustrated in any of FIGS. 13 to 17 are denoted by the same reference signs. In FIG. 27, point Rc is a point at which a straight line K11 connecting the laser irradiation position V to the lowermost point A of the rail head side surface intersects the web of the rail 3. Point Rd is a point at which a straight line K12 connecting the laser irradiation position V to the rail side upper corner point B intersects the bottom of the rail 3. In this regard, assuming that a straight line connecting the laser irradiation position V to the uppermost point C of the rail bottom side surface is K13, an angle between the straight line K13 and the straight line K11 (hereinafter referred to as an "optical path angle") is φ1, and an angle between the straight line K13 and the straight line K12 is φ2, then these optical path angles φ1 and φ2 can be represented by the following formulas.

$$\varphi 1=\tan^{-1}\{(G/2)/(Hv+a)\}-\tan^{-1}\{(G/2+d)/(Hv+c)\} \quad (5)$$

$$\varphi 2=\tan^{-1}\{(G/2+d)/(Hv+a)\}-\tan^{-1}\{(G/2-e)/(Hv-c)\} \quad (6)$$

Because the laser light is radiated from the laser scanner at given angle intervals, measurement points proportional to the optical path angles can be obtained.

Figure 28:
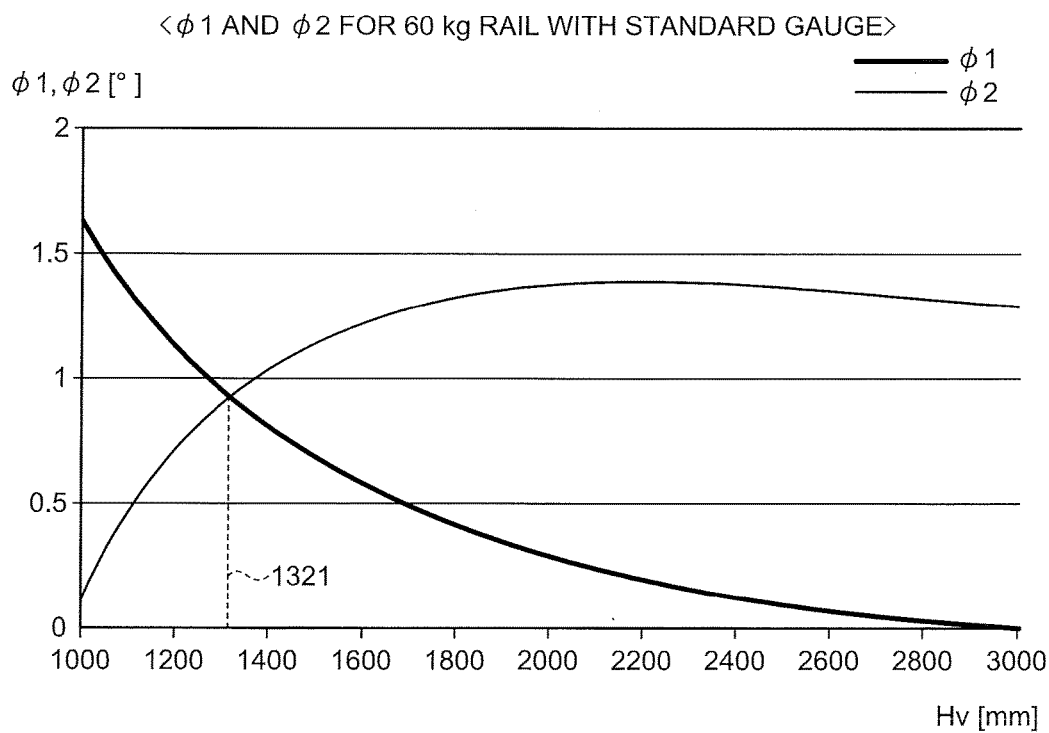
FIG. 28 is a diagram illustrating an exemplary computation result (standard gauge, 60 kg rail) for optical path angles $\varphi 1$ and $\varphi 2$.
Figure 29:
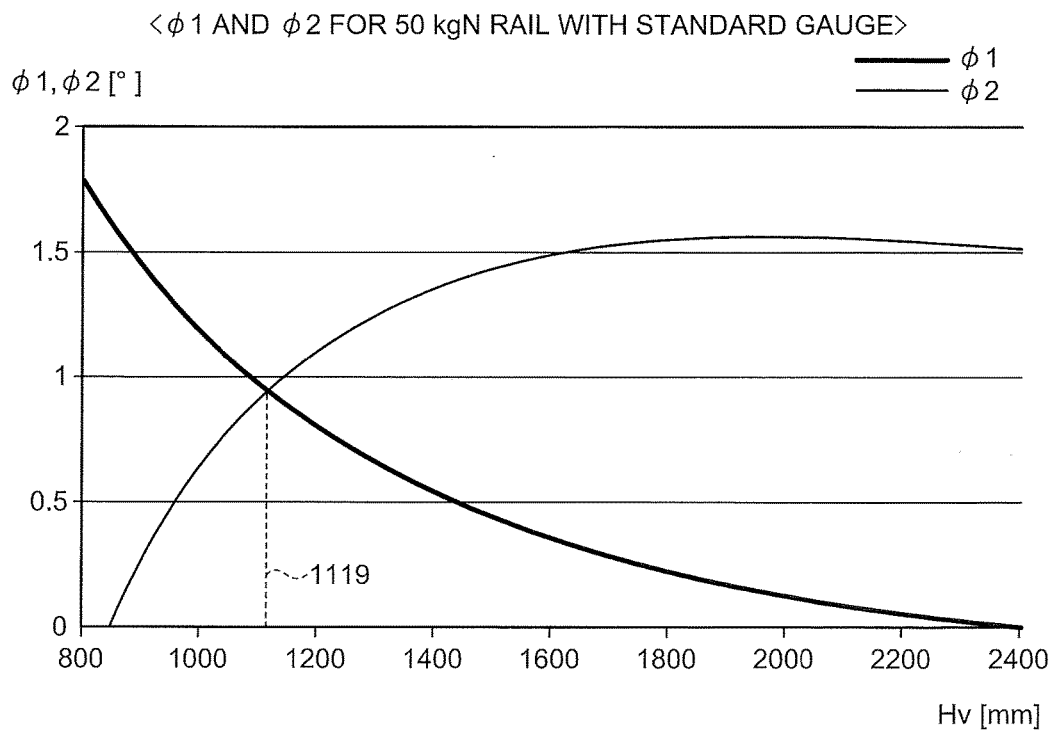
FIG. 29 is a diagram illustrating an exemplary computation result (standard gauge, 50 kgN rail) for the optical path angles $\varphi 1$ and $\varphi 2$.
Figure 30:
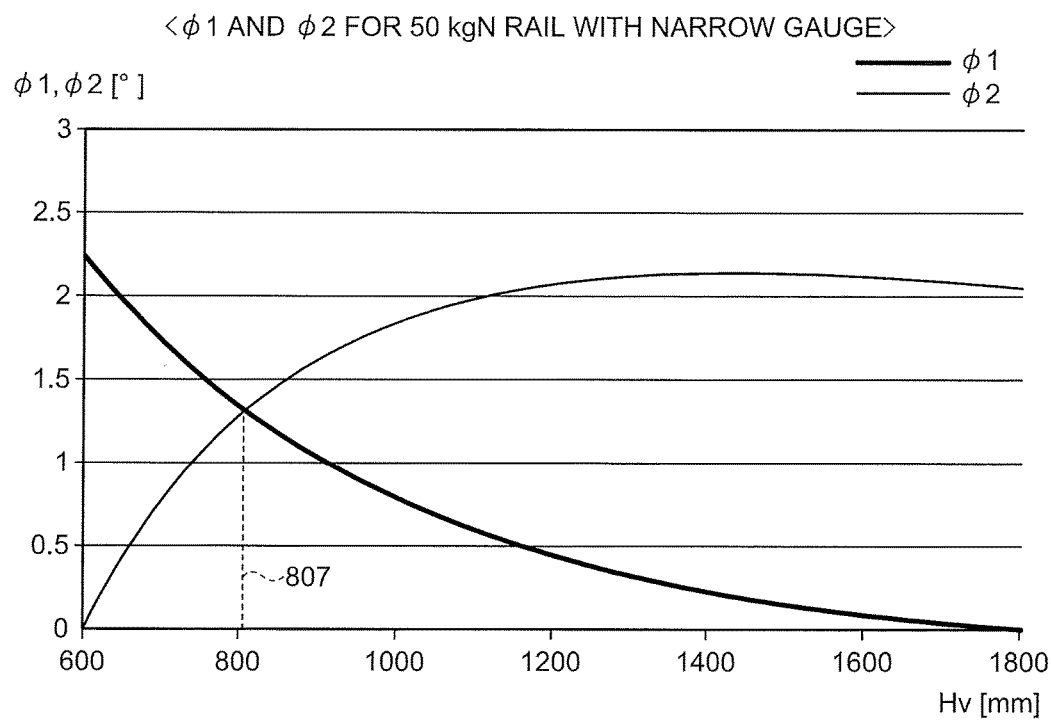
FIG. 30 is a diagram illustrating an exemplary computation result (narrow gauge, 50 kgN rail) for the optical path angles $\varphi 1$ and $\varphi 2$.
Figure 31:
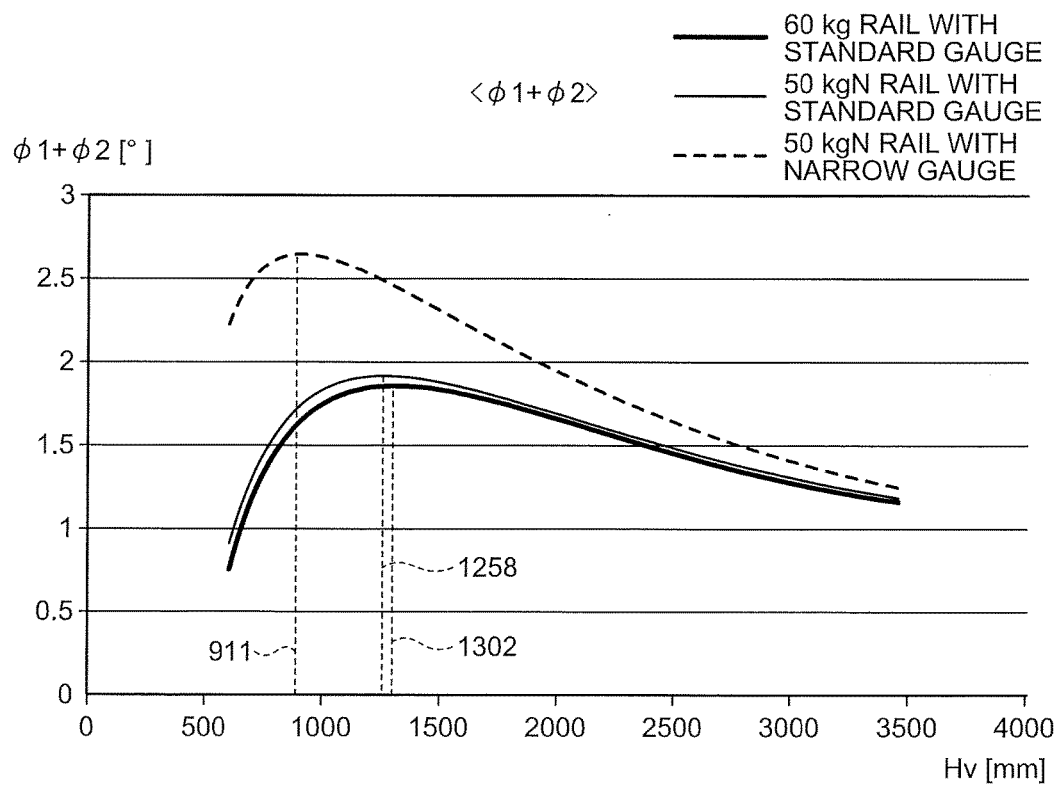
FIG. 31 is a diagram comparing the respective sums of the optical path angles $\varphi 1$ and the corresponding optical path angles $\varphi 2$ in FIGS. 28 to 30.

FIGS. 28 to 31 are diagrams (graphs) illustrating computation results from computing the optical path angles φ1 and φ2 and Hv with the use of the respective exemplary numerical values illustrated in FIGS. 18 to 21. The optical path angles φ1 and φ2 (refer to FIG. 27) for the 60 kg rail with the standard gauge are illustrated in FIG. 28. The optical path angles φ1 and φ2 for the 50 kgN rail with the standard gauge are illustrated in FIG. 29. The optical path angles φ1 and φ2 for the 50 kgN rail with the narrow gauge are illustrated in FIG. 30. Among them, in each of FIGS. 28 to 30, a horizontal axis represents the laser irradiation position Hv, and a vertical axis represents φ1 (thick solid line) and φ2 (thin solid line). In FIG. 31, the respective sums of the optical path angles φ1 and the corresponding optical path angle φ2 in FIGS. 28 to 30 are illustrated in comparison with one another.

As illustrated in each of FIGS. 28 to 30, there is a contradicting relation between the optical path angle φ1 and the optical path angle φ2. In other words, if one increases, the other decreases, and if one decreases, the other increases. Therefore, a value of Hv that satisfies φ1=φ2 exists between the optical path angle φ1 and the optical path angle φ2 and, as illustrated in FIG. 31, a value of Hv that maximizes their sum (=φ1+φ2) also exists. FIG. 32 is a diagram illustrating these values in the form of a table, in which (3) has the values of the height Hv that satisfy φ1=φ2, and (4) has the values of the height Hv that maximize φ1+φ2.

Both (3) and (4) mentioned above are examples that provide the appropriate laser irradiation positions and have the following advantages in the same way as the measurement ranges ha and hb illustrated in FIGS. 22 to 25.

In a case where the example (3), namely, the value of Hv that satisfies φ1=φ2, is selected, an angle for scanning the rail web side is equal to an angle for scanning the rail bottom side, assuming that the uppermost point C of the rail bottom side surface is a reference, whereby similar measurement points can be obtained for the rail web and the rail bottom. Therefore, the example (3) is effective in the position alignment of the rail in the up-down direction (vertical direction) and the left-right direction (horizontal direction), and it can obtain such an effect that the balance between the lateral direction and the longitudinal direction is improved, the position alignment is facilitated, and the resistance to the noise is strong.

In a case where the example (4), namely, the value of Hv that maximizes φ1+φ2, is selected, the angles for scanning the rail web and the rail bottom are maximized, whereby more measurement points can be obtained. Therefore, it is possible to obtain such an effect that the noise tolerance increases and the measurement accuracy is improved owing to the large number of measurement points.

FIG. 33 is a diagram illustrating a computation result for the laser irradiation positions for enabling the measurement of two or more points on each of the rail web and the rail bottom. In order to obtain two or more measurement points on both the rail web and the rail bottom, each of the optical path angles φ1 and φ2 needs to be set at 0.144° or greater. Therefore, assuming that a laser scanner that measures, for example, 5000 points by making one round of 360° is used for, for example, the rails having the respective exemplary numerical values illustrated in FIGS. 18 to 21, then, as illustrated in FIG. 33, the laser irradiation position for the 60 kg rail with the standard gauge only needs to be set within a range of 1006 mm to 2339 mm, the laser irradiation position for the 50 kgN rail with the standard gauge only needs to be set within a range of 873 mm to 1955 mm, and the laser irradiation position for the 50 kgN rail with the narrow gauge only needs to be set within a range of 619 mm to 1509 mm.

Figure 34:
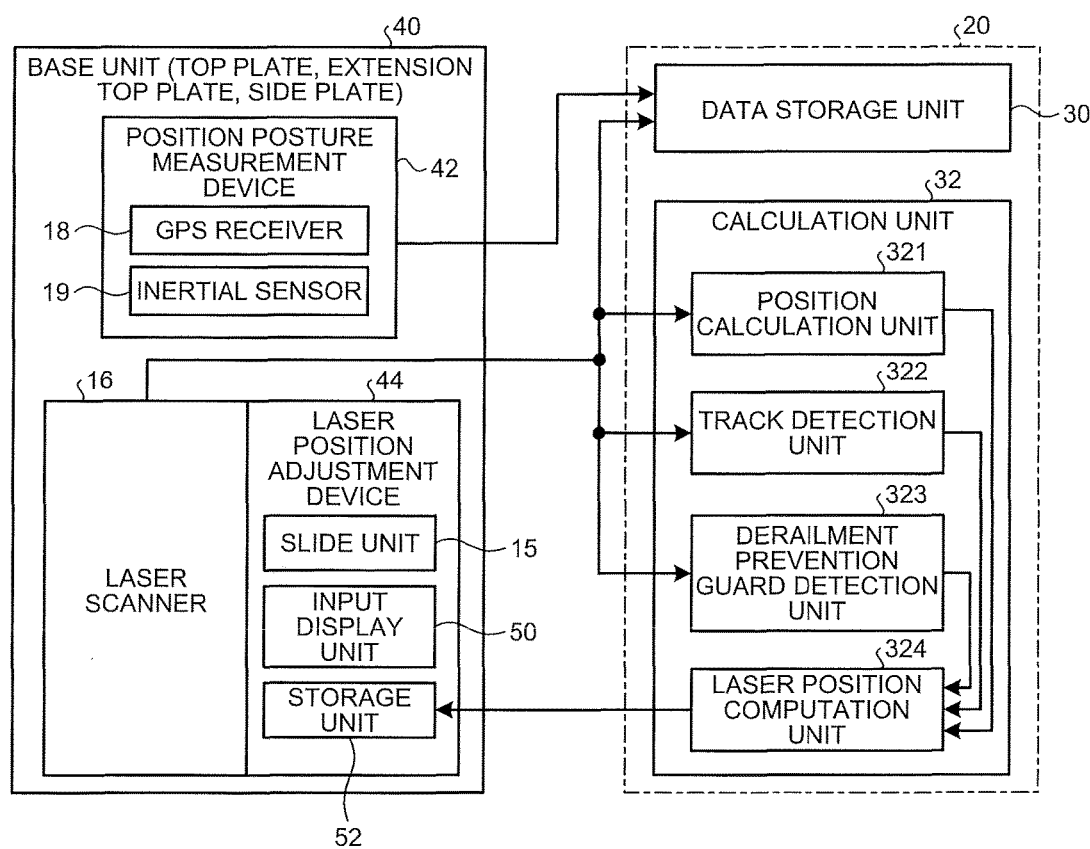
FIG. 34 is a diagram illustrating another exemplary configuration of the rail position measurement device according to the third embodiment.

FIG. 34 is a diagram illustrating another exemplary configuration of the rail position measurement device according to the third embodiment. The rail position measurement device illustrated in FIG. 34 is configured in such a manner that the laser position adjustment device 44 in the configuration in FIG. 7 includes an input display unit 50 and a storage unit 52. Components which are the same as or equivalent to those in FIG. 7 are denoted by the same reference signs, and overlapping descriptions will be omitted.

In FIG. 34, the storage unit 52 provided in the laser position adjustment device 44 stores information on the scanner position suitable for the measurement of the rail 3 and information on the movement amount of the laser scanner 16 calculated by the laser position computation unit 324. As described above, among the running tracks, some tracks have derailment prevention guards and others do not. There is also a track including both sections having derailment prevention guards and sections not having derailment prevention guards. Furthermore, as exemplified in FIGS. 18 to 21, there are various kinds of rails and various rail widths. Therefore, the presence or absence of the derailment prevention guard and the various rail widths and rails are set as parameters, and information on a more preferable scanner position is calculated for each parameter and stored in the storage unit 52.

It is possible to pre-acquire the data for storage in the storage unit 52 by running the measurement vehicle 1 in advance. The data is stored in the storage unit 52 in advance, and thus the data in the storage unit 52 can be called. The call for the data in the storage unit 52 can be performed using the input display unit 50. Therefore, if the information on the scanner position is stored in the storage unit 52, the calculation unit 32 does not need to be operated when the automatic position adjustment function for the laser scanner 16 is performed. In other words, if the information on the scanner position is stored in the storage unit 52, it is possible not to install the calculation unit 32 in the measurement vehicle 1.

In the configuration in FIG. 34 that is equivalent to FIG. 7, the movable mechanism that can change the installation position of the laser scanner 16 is provided on the slide unit 15 provided in the laser position adjustment device 44. However, the configuration is not limited to this example, and it is possible not to provide the movable mechanism. Because the input display unit 50 is provided in the configuration in FIG. 34, an operator may manually change the position of the laser scanner 16 by looking at the information displayed on the input display unit 50 when the storage data in the storage unit 52 can be called via the input display unit 50. In this case, a scale is preferably indicated on the slide unit 15 so that the position of the laser scanner 16 is obtained.

In FIG. 34, the example in which the configuration including the input display unit 50 and the storage unit 52 is applied to the configuration in FIG. 7 is illustrated. The input display unit 50 and the storage unit 52 may be provided in the laser position adjustment device 44 in FIG. 11 as an alternative. The provision of the input display unit 50 and the storage unit 52 is not limited to the laser position adjustment device 44, and the input display unit 50 and the storage unit 52 may be provided in the base position adjustment device 24 in FIGS. 8 and 12.

REFERENCE SIGNS LIST

1 measurement vehicle, 2 road-rail truck, 3 rail, 4 wheel, 5 iron wheel, 7 railroad vehicle, 9 derailment prevention guard, 10 vehicle, 11 support unit, top plate, 13 extension top plate, 14 side plate, 15 slide unit, 16 laser scanner, 17 wheel, 18 GPS receiver, inertial sensor, 20 data processing unit, 21 velocity detection device, 22 odometer, 24 base position adjustment device, 30 data storage unit, 32 calculation unit, 40 base unit, 42 position posture measurement device, 44 laser position adjustment device, 50 input display unit, 52 storage unit, 321 position calculation unit, 322 track detection unit, 323 derailment prevention guard detection unit, 324 laser position computation unit, 325 base position computation unit, 326 track database, 327 position information processing unit.

The invention claimed is:

1. A rail position measurement device that measures a three-dimensional position of a rail using a measurement vehicle, the rail position measurement device comprising:
   a position posture measurement device installed on the measurement vehicle configured to measure a position and a posture of the measurement vehicle;
   a laser scanner that is a sensor installed on the measurement vehicle and configured to irradiate at least a web and a bottom of a side surface of the rail with laser light and used for measuring the three-dimensional position of the rail;
   a laser position adjustment device installed on the measurement vehicle and configured to move a position of the laser scanner in an up-down direction; and
   a calculator installed on the measurement vehicle and configured to calculate, based on measurement information of at least one of the laser scanner and the position posture measurement device, a position of the laser scanner such that at least the web and the bottom of the side surface of the rail are irradiated with the laser light.

2. The rail position measurement device according to claim 1, wherein the laser position adjustment device controls the position of the laser scanner on a basis of information from the calculator.

3. The rail position measurement device according to claim 1, wherein the laser scanner is installed on the laser position adjustment device.

4. The rail position measurement device according to claim 1, wherein the laser position adjustment device includes, in addition to a movable mechanism in the up-down direction, a movable mechanism in a horizontal direction orthogonal to both the up-down direction and a travelling direction of the measurement vehicle.

5. The rail position measurement device according to claim 1, comprising a base unit equipped with the position posture measurement device and the laser scanner, wherein
   the laser position adjustment device is an adjustment device configured to move a position of the base unit in the up-down direction.

6. The rail position measurement device according to claim 1, wherein the calculator calculates the position of the laser scanner on a basis of presence or absence of a derailment prevention guard.

7. The rail position measurement device according to claim 1, wherein
   the calculator is further configured to detect presence or absence of a derailment prevention guard from the measurement information obtained by the laser scanner, and, based on a detection result, calculate the position of the laser scanner.

8. The rail position measurement device according to claim 1, comprising a track database to store track data including gauge information at a track position and information on presence or absence of a derailment prevention guard along a running track, wherein
   the calculator calculates the position of the laser scanner on a basis of the track data and the measurement information obtained by the position posture measurement device.

9. The rail position measurement device according to claim 3, wherein the calculator calculates the position of the laser scanner on a basis of presence or absence of a derailment prevention guard.

10. The rail position measurement device according to claim 4, wherein the calculator calculates the position of the laser scanner on a basis of presence or absence of a derailment prevention guard.

11. The rail position measurement device according to claim 5, wherein the calculator calculates the position of the laser scanner on a basis of presence or absence of a derailment prevention guard.

12. The rail position measurement device according to claim 3, wherein
the calculator is further configured to detect presence or absence of a derailment prevention guard from the measurement information obtained by the laser scanner, and, on a basis of a detection result, calculate the position of the laser scanner.

13. The rail position measurement device according to claim 4, wherein
the calculator is further configured to detect presence or absence of a derailment prevention guard from the measurement information obtained by the laser scanner, and calculate, on a basis of a detection result, the position of the laser scanner.

14. The rail position measurement device according to claim 5, wherein
the calculator is further configured to detect presence or absence of a derailment prevention guard from the measurement information obtained by the laser scanner, and to calculate, on a basis of a detection result, the position of the laser scanner.

15. The rail position measurement device according to claim 3, comprising a track database to store track data including gauge information at a track position and information on presence or absence of a derailment prevention guard along a running track, wherein
the calculator calculates the position of the laser scanner on a basis of the track data and the measurement information obtained by the position posture measurement device.

16. The rail position measurement device according to claim 4, comprising a track database to store track data including gauge information at a track position and information on presence or absence of a derailment prevention guard along a running track, wherein
the calculator calculates the position of the laser scanner on a basis of the track data and the measurement information obtained by the position posture measurement device.

17. The rail position measurement device according to claim 5, comprising a track database to store track data including gauge information at a track position and information on presence or absence of a derailment prevention guard along a running track, wherein
the calculator calculates the position of the laser scanner on a basis of the track data and the measurement information obtained by the position posture measurement device.

18. The rail position measurement device according to claim 1, wherein the laser scanner scans a plane orthogonal to the travelling direction of the measurement vehicle or a plane inclined at a preset angle in the travelling direction from the plane orthogonal to the travelling direction of the measurement vehicle.

19. A calculator that is used for a rail position measurement device that measures a three-dimensional position of a rail using a measurement vehicle, the calculator comprising:
a position calculator to calculate a scanner position with respect to the rail from measurement information obtained by a laser scanner that is a sensor installed on the measurement vehicle so as to be capable of irradiating at least a web and a bottom of a side surface of the rail with laser light and used for measuring the three-dimensional position of the rail; and
a laser position calculator to compute a movement amount or a scanner position of the laser scanner in an up-down direction on a basis of a calculation result from the position calculator and to transmit information on the movement amount or the scanner position to a laser position adjustment device capable of moving a position of the laser scanner in the up-down direction.

20. A calculator that is used for a rail position measurement device that measures a three-dimensional position of a rail using a measurement vehicle, the calculator comprising:
a position calculator to calculate a scanner position with respect to the rail from measurement information obtained by a laser scanner that is a sensor installed on the measurement vehicle so as to be capable of irradiating at least a web and a bottom of a side surface of the rail with laser light and used for measuring the three-dimensional position of the rail; and
a processor configured to compute a movement amount or a movement position of a base unit equipped with the laser scanner in an up-down direction on a basis of a calculation result from the position calculator and to transmit the movement amount or the movement position to a base position adjustment device capable of moving a position of the base unit in the up-down direction.

* * * * *